(12) United States Patent
Raj

(10) Patent No.: US 10,590,044 B1
(45) Date of Patent: Mar. 17, 2020

(54) ENGINEERED MATRIX SELF-HEALING COMPOSITES

(71) Applicant: U.S.A. as represented by the Administrator of the National Aeronautics and Space Administration, Washington, DC (US)

(72) Inventor: Sai V. Raj, Strongsville, OH (US)

(73) Assignee: United States of America as Represented by the Administrator of National Aeronautics and Space Administration, Washington, DC (US)

(*) Notice: Subject to any disclaimer, the term of this patent is extended or adjusted under 35 U.S.C. 154(b) by 17 days.

(21) Appl. No.: 15/411,375

(22) Filed: Jan. 20, 2017

Related U.S. Application Data

(63) Continuation-in-part of application No. 13/905,333, filed on May 30, 2013.

(60) Provisional application No. 62/281,927, filed on Jan. 22, 2016, provisional application No. 61/654,311, filed on Jun. 1, 2012.

(51) Int. Cl.
| | |
|---|---|
| C04B 41/52 | (2006.01) |
| C04B 41/50 | (2006.01) |
| C04B 41/45 | (2006.01) |
| C04B 41/00 | (2006.01) |
| C04B 41/85 | (2006.01) |
| C04B 35/565 | (2006.01) |

(52) U.S. Cl.
CPC ............ *C04B 41/52* (2013.01); *C04B 35/565* (2013.01); *C04B 41/009* (2013.01); *C04B 41/4515* (2013.01); *C04B 41/4523* (2013.01); *C04B 41/5071* (2013.01); *C04B 41/85* (2013.01); *C04B 2235/3826* (2013.01); *C04B 2235/3891* (2013.01); *C04B 2235/616* (2013.01)

(58) Field of Classification Search
CPC ... C04B 41/52; C04B 41/009; C04B 41/4515; C04B 41/4523; C04B 41/5071; C04B 41/85; C04B 35/565; C04B 2235/3826; C04B 2235/3891; C04B 2235/616
USPC ...................................................... 427/419.7
See application file for complete search history.

(56) References Cited

U.S. PATENT DOCUMENTS

| | | | |
|---|---|---|---|
| 3,718,441 A | 2/1973 | Landingham | |
| 4,240,835 A | 12/1980 | Laskow et al. | |
| 4,889,686 A * | 12/1989 | Singh | C04B 35/573 156/89.25 |
| 5,069,841 A | 12/1991 | Petrovic et al. | |
| 5,292,692 A | 3/1994 | Maloney et al. | |
| 5,294,489 A | 3/1994 | Luthra et al. | |

(Continued)

FOREIGN PATENT DOCUMENTS

| | | |
|---|---|---|
| EP | 0946460 B1 | 6/1999 |
| EP | 1059274 A1 | 12/2000 |

(Continued)

OTHER PUBLICATIONS

Raj,Sai V., Thermal expansion behavior of hot-pressed engineered matrices, Ceramics International, Feb. 1, 2016, pp. 2557-2569, vol. 42, Issue 2, Elsevier US.

(Continued)

*Primary Examiner* — Alexander M Weddle
(74) *Attorney, Agent, or Firm* — Robert H. Earp, III

(57) ABSTRACT

An engineered matrix is provided to blunt and self-heal matrix cracks to reduce oxygen ingress into a fiber reinforced composite.

20 Claims, 28 Drawing Sheets

(56) References Cited

U.S. PATENT DOCUMENTS

| | | | |
|---|---|---|---|
| 5,330,590 A * | 7/1994 | Raj | C22C 29/18 |
| | | | 148/423 |
| 5,330,854 A | 7/1994 | Singh | |
| 5,376,427 A | 12/1994 | Singh | |
| 5,429,997 A | 7/1995 | Hebsur | |
| 5,510,303 A | 4/1996 | Kameda et al. | |
| 5,643,514 A | 7/1997 | Chwastiak | |
| 5,900,277 A * | 5/1999 | Fox | C04B 41/5155 |
| | | | 164/97 |
| 5,962,103 A | 10/1999 | Luthra et al. | |
| 5,990,025 A | 11/1999 | Suyama et al. | |
| 6,024,898 A * | 2/2000 | Steibel | C04B 35/806 |
| | | | 264/29.1 |
| 6,288,000 B1 | 9/2001 | Hebsur | |
| 7,258,530 B2 | 8/2007 | Morrison et al. | |
| 8,043,720 B2 | 10/2011 | Corman et al. | |
| 2006/0169404 A1 | 8/2006 | Thebault et al. | |
| 2009/0264273 A1 | 10/2009 | Riedell et al. | |
| 2010/0009143 A1 | 1/2010 | Pallier et al. | |
| 2011/0236695 A1 | 9/2011 | Schmidt | |
| 2011/0256411 A1 | 10/2011 | Courcot et al. | |
| 2011/0268577 A1 | 11/2011 | Bouillon et al. | |
| 2012/0076927 A1 * | 3/2012 | Bhatt | C04B 35/565 |
| | | | 427/122 |
| 2016/0040299 A1 * | 2/2016 | Allemand | C04B 41/89 |
| | | | 427/397.7 |

FOREIGN PATENT DOCUMENTS

| | | | | | |
|---|---|---|---|---|---|
| FR | WO 2010072978 | A1 | | 7/2010 | |
| FR | WO 2010063946 | A1 | | 6/2019 | |
| WO | WO-2014135700 | A1 * | 9/2014 | | C04B 41/89 |

OTHER PUBLICATIONS

"Slurry Characteristics", dated Jun. 18, 2019. (Year: 2019).

Hebsur, Mohan G., Development and Characterization, Materials Science and Engineering, (1999), pp. 24-37, vol A261.

Quemard, Self-healing mechanisms of a SiC fiber reinforced multi-layered ceramic matrix composite in hight pressure steam environments, Journal of the European Ceramic Society, (2007), pp. 2085-2094, vol. 27.

Naslain, Boron-bearing species in ceramic matrix composites for long-term aerospace applications, Journal of Solid State Chemistry, Elsevier, (2004), pp. 449-456, vol. 177, USA.

Emiliani, Characterization and oxidation resistance of hot-pressed chromium diboride, Material Science and Engineering, (1993), pp. 111-124, vol A172, USA.

Nakao, Effect of SiC Nano sizing on self-crack-healing during service, Proceedings of the First International Conference on Self Healing Materials, Apr. 2007, Noordwijk aan Zee, the Netherlands.

Jung, Self-Healing of Heavily Machined Cracks in Si3N4/SiC and Resultant High-Temperature Fatigue Strength, Proceedings of the First International Conferende on Self Healing Materials, Apr. 2007, Noordwijk aan Zee, the Netherlands.

Zuo, Oxidation behavior of tow-dimensional C/SiC modified with self-healing Si-B-C coating in static air, Corrosion Science, Elvsevier, (2012), pp. 87-93, vol. 65.

Yin, Microstructure and oxidation resistance of carbon/silicon carbide composites infiltrated with chromium silicide, Materials Science and Engineering, Elsevier, (2000), pp. 89-94, vol. A290.

Luthra, Melt Infiltrated (MI) SiC/SiC composited for Gas Turbines Applications, (2003), USA.

Dicarlo, Fabrication Routes for Continuous Fiber—Reinforced Ceramic Composites (CFCC), NASA/TM, (1998), USA.

Petrovic, J. J., & Honnell, R. E. MoSi2 particle reinforced-Sic and Si3N4 matrix composites. Journal of Materials Science Letters, 9(9), pp. 1083-1084. doi: 10.1007/bf00727883 (Year: 1990).

Families of intermetallic structure types: A selection, Pergamon Materials Series, Pergamon, 2008, vol. 13, pp. 617-750, ISSN 14 70-1804, ISBN 9780080440996, http ://dx.doi.org/1 0.1 016/S 14 70/1804(08)80009-0.

Johnson, S, Recent Development in Ultra High Temperature Ceramics at NASA Ames, AIAA, 2009 Paper No. 2009-7219.

Chawla, Ceremic Reinforements, Ceramic Matrix Composites, Second Edition, pp. 47-105 (2003).

Dictionary.com, "blunt", http://dictionary.reference.com/browse/blunt?s=t, accessed Sep. 14, 2015.

Feng, T., The oxidation behavior and mechanical properties of MoSi2—CrSi2—SiC—Si coated carbon/carbon composites in high-temperature oxidizing atmosphere, Corrosion Science 53, Aug. 22, 2011, 4102-4108.

* cited by examiner

2100

ENGINEERED MATRIX SELF-HEALING COMPOSITES

CROSS REFERENCE TO RELATED APPLICATIONS

This application claims the benefit of U.S. Provisional Application Ser. No. 62/281,927, filed on Jan. 22, 2016, and is a continuation-in-part application of U.S. patent application Ser. No. 13/905,333 filed on May 30, 2013, which claims the benefit of U.S. Provisional Patent Application Ser. No. 61/654,311 filed Jun. 1, 2012. The subject matter of these earlier-filed applications is hereby incorporated by reference in its entirety.

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

FIELD

The present invention relates to self-healing composites and, more particularly, to a high temperature lightweight self-healing composite for high temperature applications.

BACKGROUND

Current generation of SiC/SiC ceramic matrix composites (CMC) rely almost entirely on the silicon carbide (SiC) fibers to carry the load above the matrix cracking stress. As a result, the high temperature usefulness of these CMCs falls well below their theoretical capabilities.

Currently, there are four broad classes of silicon carbide-based CMCs depending on the processing methods: (a) Melt infiltration (MI), (b) Chemical Vapor Infiltration (CVI), (c) Polymer Infiltration and Pyrolysis (PIP), and (d) Hot Pressing (HP). In all CMC manufacturing, the starting material is a 1-D SiC fiber tow, a 2-D woven cloth, or 3-D woven fiber preforms. The starting material is then coated with single or multi-layered interface coatings to reduce strength degradation of the fibers during composite fabrication, as well as to provide crack deflection path along the interface during loading of the composite.

Depending on the consolidation methods, the interface coated 1-D SiC fiber tows wound on a drum coated with the matrix slurry or the ceramic yielding polymer, dried, cut into required size, stacked, pressed to prepare a green body or the interface coated 2-D woven cloth are further coated with matrix slurry or ceramic yielding polymers, dried, cut into required size, stacked and pressed to prepare a green body. The green body can be hot pressed directly or can be pyrolyzed then wicked with molten silicon or ceramic yielding polymer. Also, 2-D cloth or 3-D fiber preforms are compressed in a tooling graphite die, interface coated, and then infiltrated with SiC coating by CVI to stiffen the fibers, as well as prepare composite preforms with certain levels of interconnected open porosity. These composite preforms can be infiltrated with ceramic particles and then with silicon or ceramic yielding polymer.

Irrespective of the manufacturing details, the final step in the melt infiltration (MI) fabrication of many CMCs generally involves infiltrating or wicking molten silicon into particulate filled or unfilled SiC composite preforms. Although these CMCs are denser than those prepared by non-MI methods, the presence of free silicon in the matrix restricts their use to below 1623 Kelvin (K) because of silicon diffusing into interface coating(s) and the load bearing SiC fibers, and drastically degrading the in-plane properties.

In the case of CMCs fabricated by CVI, the presence of angular voids in the CVI matrix significantly reduces the matrix cracking stress and through-the-thickness thermal conductivity. Additionally, oxygen ingression from the external surfaces through surface-connected voids and cracks in the matrix can lead to the oxidation of the protective fiber coatings, thereby reducing durability of the CMCs.

Thus, the development of high temperature, lightweight, SiC fiber-reinforced ceramic composites with engineered matrices (EM), which exhibits a degree of matrix plasticity and self-healing characteristics, would be a significant improvement over the current state of the art.

SUMMARY

Certain embodiments of the present invention may provide solutions to the problems and needs in the art that have not yet been fully identified, appreciated, or solved by current SiC-based engineered matrices. For instance, certain embodiments pertain to high temperature, lightweight, self-healing ceramic composites (SHCCs). In one embodiment, SiC fiber-reinforced SiC—$Si_3N_4$-silicide matrix composites are developed having a composition formulated to match the coefficient of thermal expansion (CTE) of the SiC fibers, exhibit matrix fracture toughness, and with the ability to self-heal cracks by filling the cracks with low viscosity oxides to minimize oxygen ingress into the composite.

In one embodiment, an apparatus is provided. The apparatus includes an engineered matrix configured with ductile particles to blunt and self-heal matrix cracks to reduce oxygen ingress into a fiber reinforced composite.

In another embodiment, an apparatus is provided. The apparatus includes an engineered matrix applied to fiber reinforced composite. The fiber reinforced composite comprising a plurality of fibers, and the engineered matrix is configured with ductile particles to blunt and self-heal matrix cracks in the fiber reinforced composite.

In yet another embodiment, an apparatus is provided. The apparatus includes an engineered matrix. The engineered matrix includes a mixture of chromium-molybdenum-silicon alloys (CrMoSi) silicon carbide, silicon nitride and self-healing additives. The mixture is configured with ductile particles to blunt matrix cracks and reduce the ingression of oxygen into a fiber reinforced composite.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
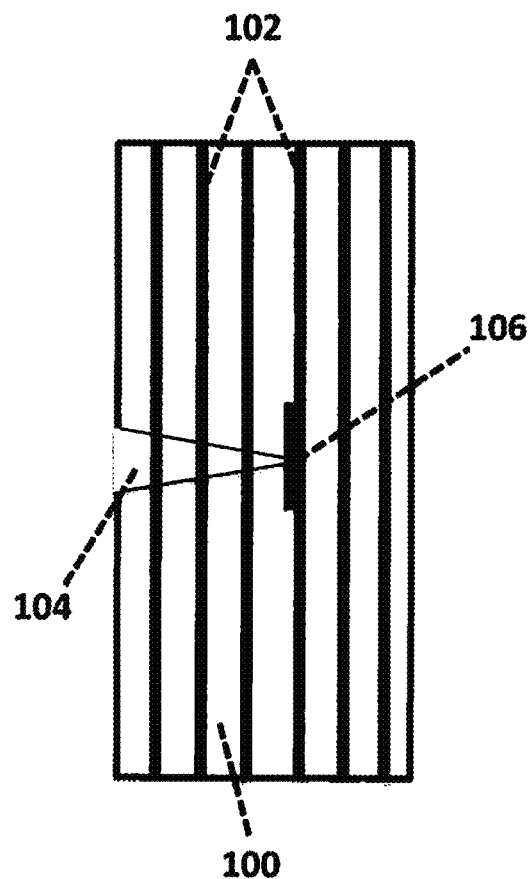
FIG. 1 illustrates a schematic of a conventional SiC/SiC CMC matrix.

FIG. 1 illustrates a conventional SiC/SiC CMC matrix 100 having a plurality of SiC fibers 102 and a crack 104. These SiC fibers are coated with a layer of boron nitride to improve the room temperature fracture toughness of the composite. However, it should be noted that matrix 100 is brittle at all temperatures and has limited plasticity at high temperature, leading to fast crack propagation (e.g. interface debonding 106) in matrix 100. Thus, matrix 100 cannot bear the applied load beyond the matrix cracking stress. Crack 104 allows oxygen to interact with SiC fibers 102 and the interface coating. When oxygen interacts with the boron nitride coating and SiC fibers 102, the durability and strength of the SiC fibers 102 is greatly reduced. Also, matrix 100 of FIG. 1 does not have a self-healing component, and does not have a crack tip blunting ability due to the absence of well dispersed ductile particles.

Also, because matrix 100 may be infiltrated with silicon, the presence of free silicon becomes detrimental to the life of the composite. In particular, the life of the composite is limited to applications below a certain temperature (generally less than 1623 K) due to the silicon reacting with the boron nitride coating of SiC fibers 102.

Embodiments of the present invention pertain to an engineered matrix (EM) that can lead to improved fracture toughness due to crack blunting, as well as crack self-healing, i.e., fill up the crack to reduce oxygen ingress to the fibers in a fiber reinforced composite. As a result, the high temperature strength of the composite should increase since the EM design would allow it to carry the applied load for a longer duration before shedding it on the fibers.

Figure 2:
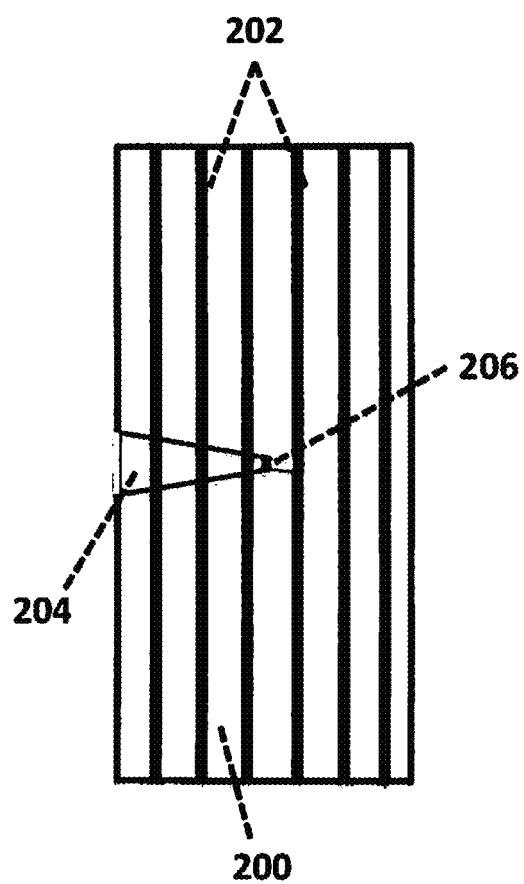
FIG. 2 illustrates a schematic of a matrix with crack blunting ability, according to an embodiment of the present invention.

FIG. 2 illustrates an engineered matrix 200 with a crack blunting particle 206, according to an embodiment of the present invention. In this embodiment, the crack blunting particle 206 increases the fracture toughness of the engineered matrix 200 by blunting the crack tip and slowing or stopping the growth of a crack 204 within the matrix 200. Essentially, due to the presence of the crack blunting particle 206, the growth of crack 204 is reduced or stopped. This minimizes the chances of overloading and subsequent failure of the SiC fibers 202 and prevents the premature failure of the composite.

It should also be appreciated that in certain embodiments, the engineered matrix 200 may be plastically compliant at high temperatures to blunt cracks in the SiC fibers, as shown in FIG. 2. To make the engineered matrix 200 plastically compliant, additives may be applied. For example, CrMoSi may be used to ensure that engineered matrix 200 is plastically compliant. In some embodiments, chromium disilicide ($CrSi_2$) may be used to ensure that engineered matrix 200 is plastically compliant to blunt the cracks. Alternatively, a combination of a CrMoSi alloy and $CrSi_2$ may be used for crack blunting.

Figure 3:
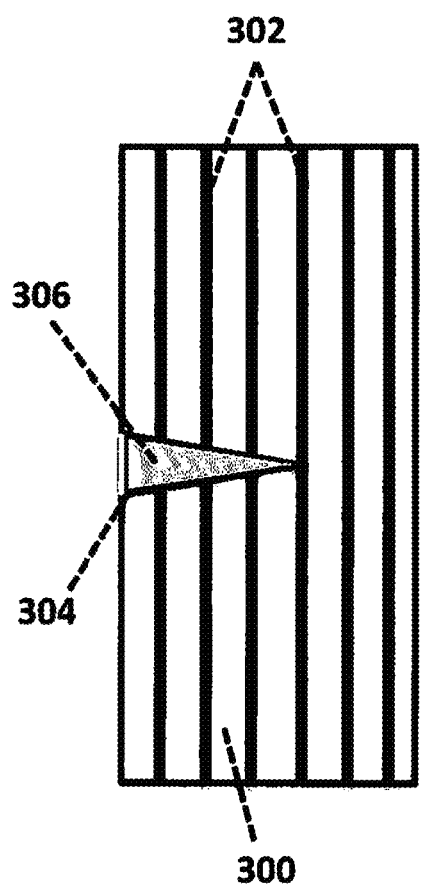
FIG. 3 illustrates a schematic of a matrix with a self-healing additive, according to an embodiment of the present invention.

FIG. 3 illustrates an engineered matrix 300 with a self-healing component 306, according to an embodiment of the present invention. With a self-healing component 306, crack 304 can be healed quickly, thereby preventing oxygen from reacting with the coatings on the SiC fibers. As a result, the durability of the engineered matrix 300 is improved. It should be appreciated that engineered matrix 300 may have a thermal strain that is compatible with SiC fibers 302.

TABLE 1

Major and Minor Matrix Embodiments

Major silicide additives and alternative embodiments
Cr-Mo-Si alloys with Mo between 0 to 40 atomic
percent and Si between 23 and 67 atomic percent.
$HfSi_2$, $MoSi_2$, $NbSi_2$, $TaSi_2$, $TiSi_2$, $ReSi_2$, $WSi_2$ with
alloy additions of aluminum (Al), chromium (Cr),
hafnium (Hf), molybdenum (Mo), niobium (Nb),
rhenium (Re), tantalum (Ta), titanium (Ti), and
tungsten (W) between 0 and 40 atomic percent.

Minor Additives

Boron Carbide ($B_4C$): 0-10 weight percent;
Chromium boride ($CrB_2$): 0-10 weight percent;
Germanium (Ge): 0-5 weight percent;
Yttrium (Y): 0-5 weight percent;
Zirconium diboride ($ZrB_2$): 0-10 weight percent.
Zirconium silicate ($ZrSiO_4$): 0-5 weight percent.

As shown in Table 1 above, a range of compositions for CrMoSi alloys is provided, as well as self-healing additives used singly or in combination in the engineered matrices. Other embodiments involving other silicides used singly or in combination with suitable alloying elements are included in table 1.

TABLE 2

Matrix Design Concepts
$(\Delta L/L_0)_{Em} = V_{silicide}(\Delta L/L_0)_{silicide} + V_{SiC}(\Delta L/L_0)_{SiC} + V_{Si3N4}$

| Concept | $V_{silicide}$ (%) | $V_{sic}$ (%) | $V_{Si3N4}$ (%) |
|---|---|---|---|
| Traditional | 0 | 100 | 0 |
| Present Embodiments | x | (100-x-y) | y |

Table 2 shows the differences in the matrix design concepts between the traditional and the present embodiments designed to match the thermal strains developed in the fibers and the matrix during thermal cycling. The use of silicides is an illustration of some of the embodiments described herein.

Figure 4:
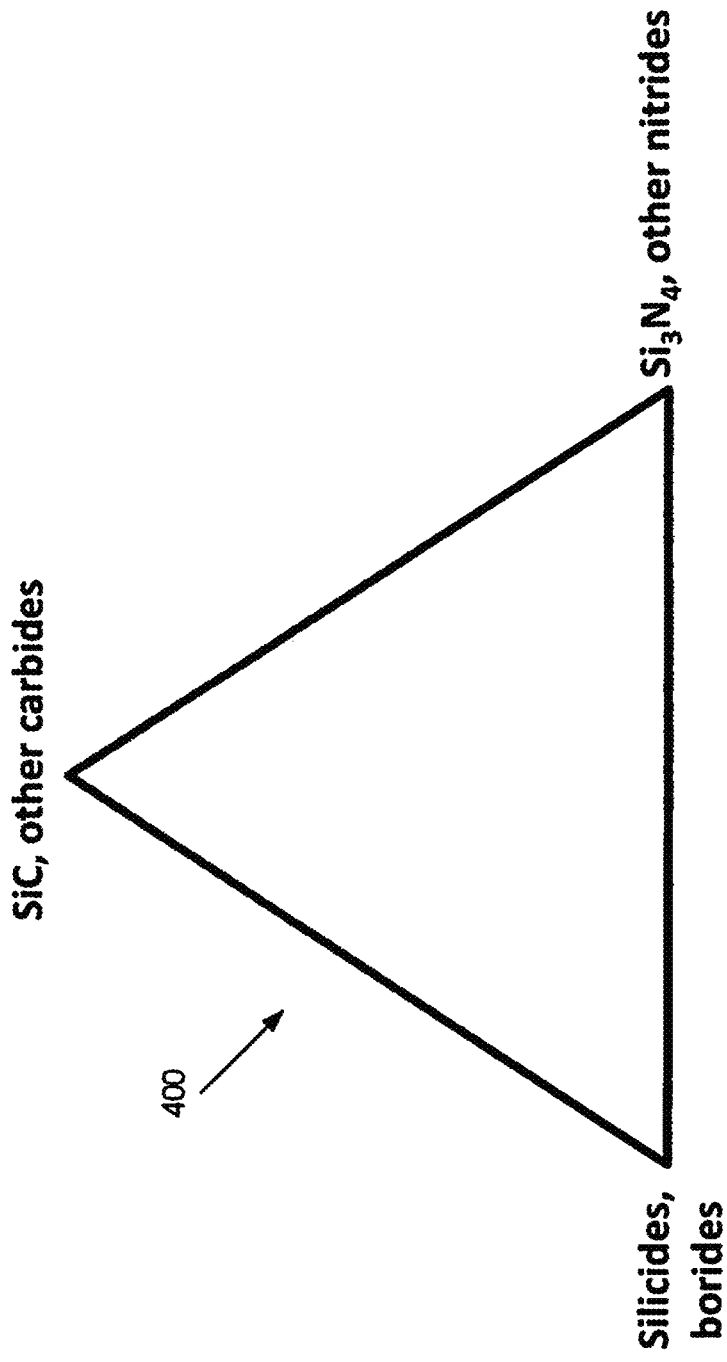
FIG. 4 is a schematic illustration of the matrix design concept shown in Table 2, according to an embodiment of the present invention.

FIG. 4 is a schematic 400 illustrating a matrix design concept of Table 2, according to an embodiment of the present invention. In this embodiment, FIG. 4 shows a concept that can be used for borides, carbides, nitrides and silicides of aluminum (Al), chromium (Cr), hafnium (Hf), molybdenum (Mo), niobium (Nb), rhenium (Re), tantalum (Ta), titanium (Ti), and zirconium (Zr), either alone or in combination, to match the thermal strains developed in the fibers and the matrix during thermal cycling.

Figure 5:
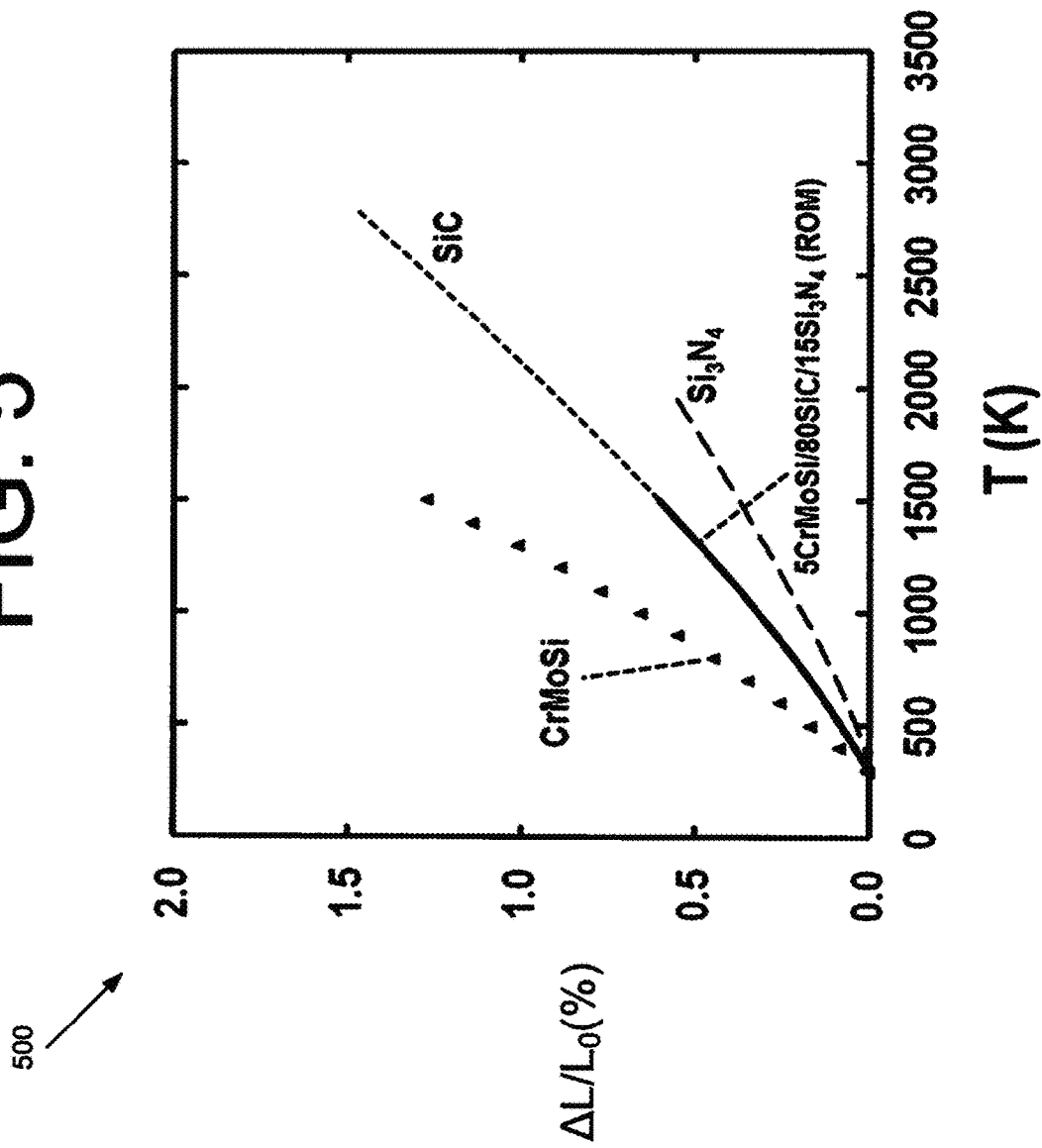
FIG. 5 is a graph illustrating a theoretical prediction based on a mixture of CrMoSi alloy and other compatible silicides with silicon nitride and silicon carbide, according to an embodiment of the present invention.

FIG. 5 is a graph 500 illustrating a theoretical prediction based on a mixture of CrMoSi and other compatible silicides with silicon nitride and silicon carbide, according to an embodiment of the present invention. In particular, FIG. 5 shows a graph 500 illustrating a theoretical prediction of the thermal strain with increasing absolute temperature based on a mixture of 5 percent CrMoSi, 80 percent SiC, and 15 percent $Si_3N_4$. Similar embodiments involving borides, carbides and nitrides are possible as demonstrated in FIG. 4.

Figure 6:
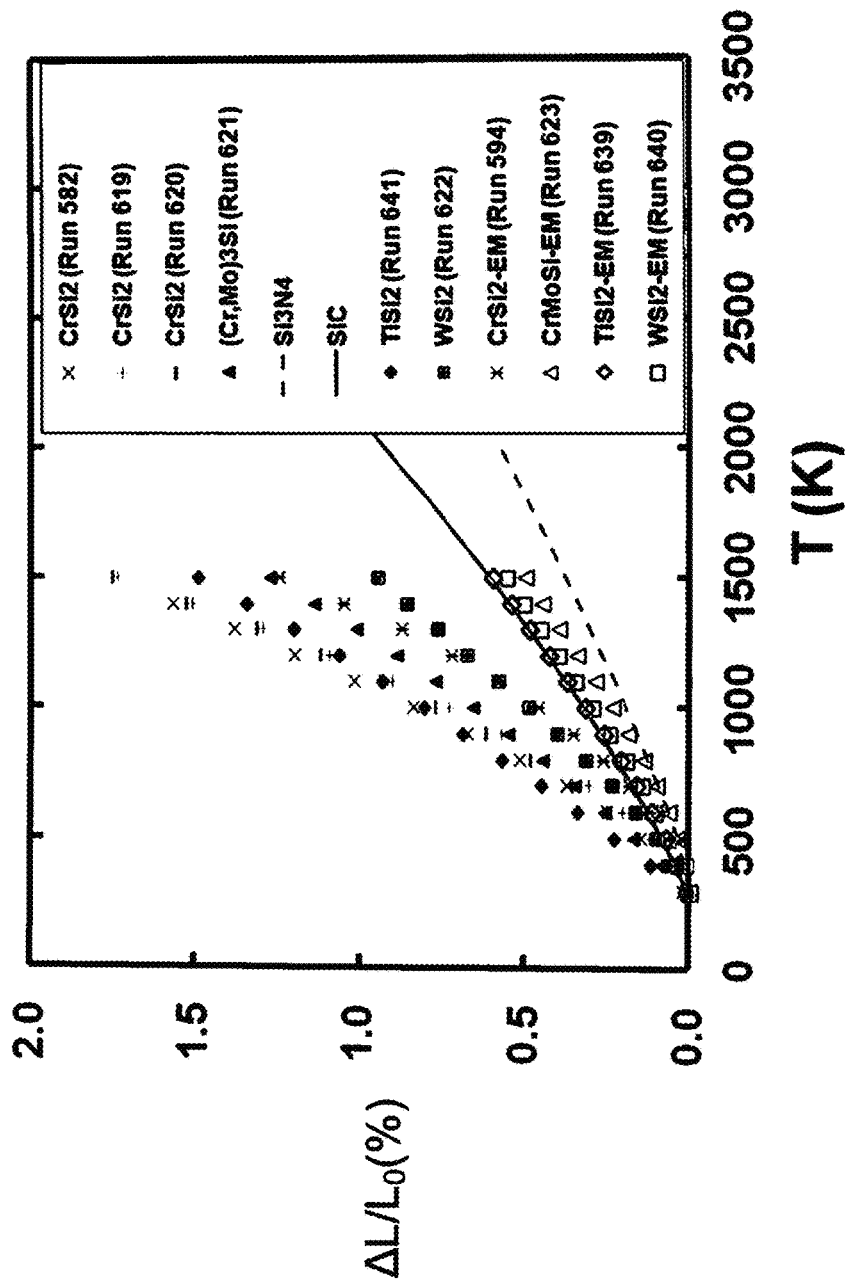
FIG. 6 is a graph illustrating proofs of concepts of several mixtures, according to an embodiment of the present invention.

FIG. 6 is a graph 600 illustrating proofs of concepts of several mixtures, according to an embodiment of the present invention. In particular, FIG. 6 shows a graph 600 illustrating a proof of concept of the mixture shown in FIG. 5. For instance, graph 600 shows that the mixture in FIG. 5 allows the engineered matrix to have a thermal strain that is compatible with a thermal strain of the silicon carbide fibers.

Figure 7:
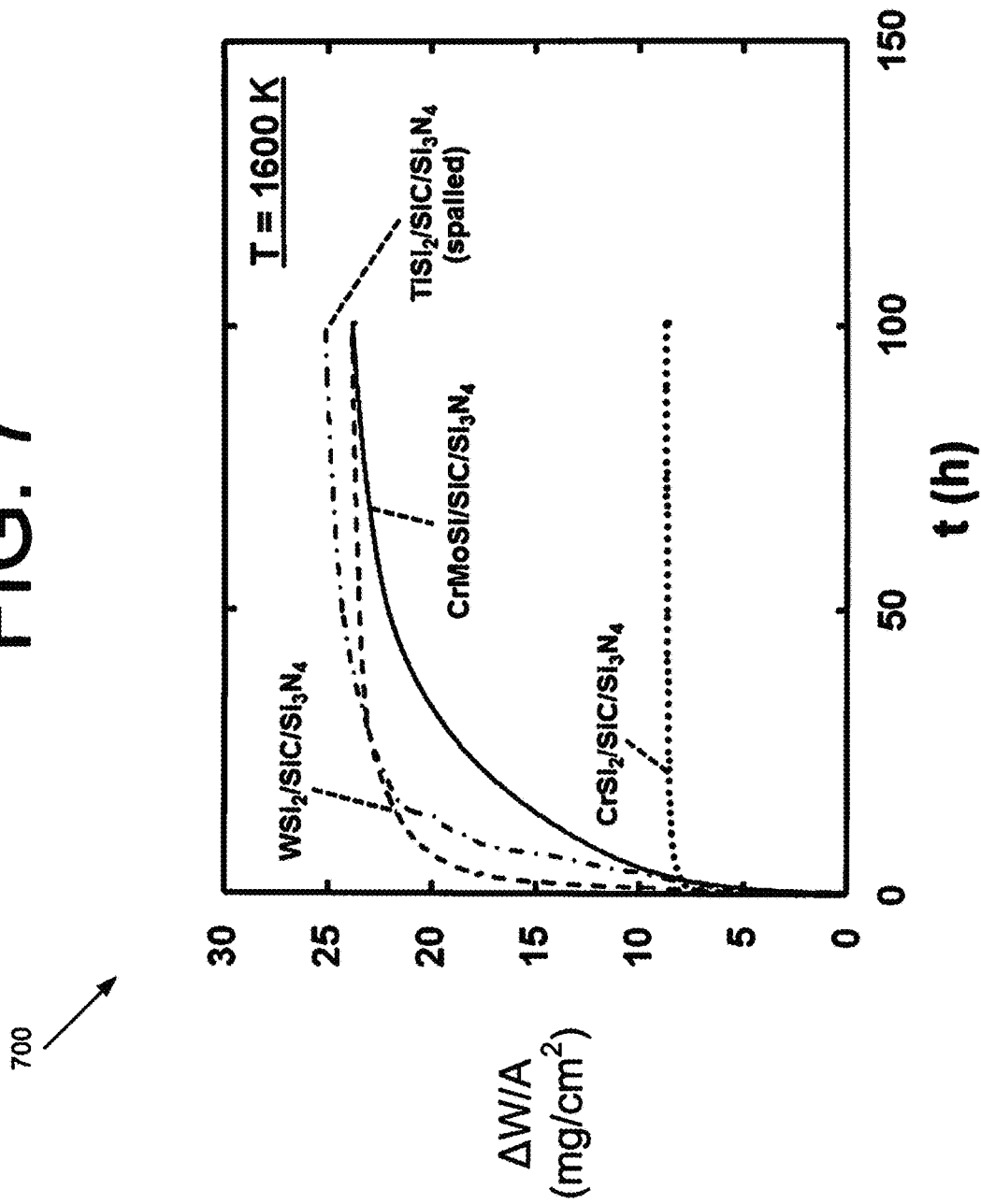
FIG. 7 is a graph illustrating the isothermal oxidation behavior of engineered silicide matrices, according to an embodiment of the present invention

FIG. 7 is a graph 700 illustrating the isothermal oxidation behavior of the engineered silicide matrices, according to an embodiment of the present invention. In particular, FIG. 7 shows the isothermal oxidation behavior of several silicide/SiC/$Si_3N_4$ engineered ceramic matrices. In this embodiment, the engineered matrices include sufficient oxidation properties and exhibit parabolic oxidation, that is, where the oxidation rate slows with increasing time at a constant temperature.

Figure 8:
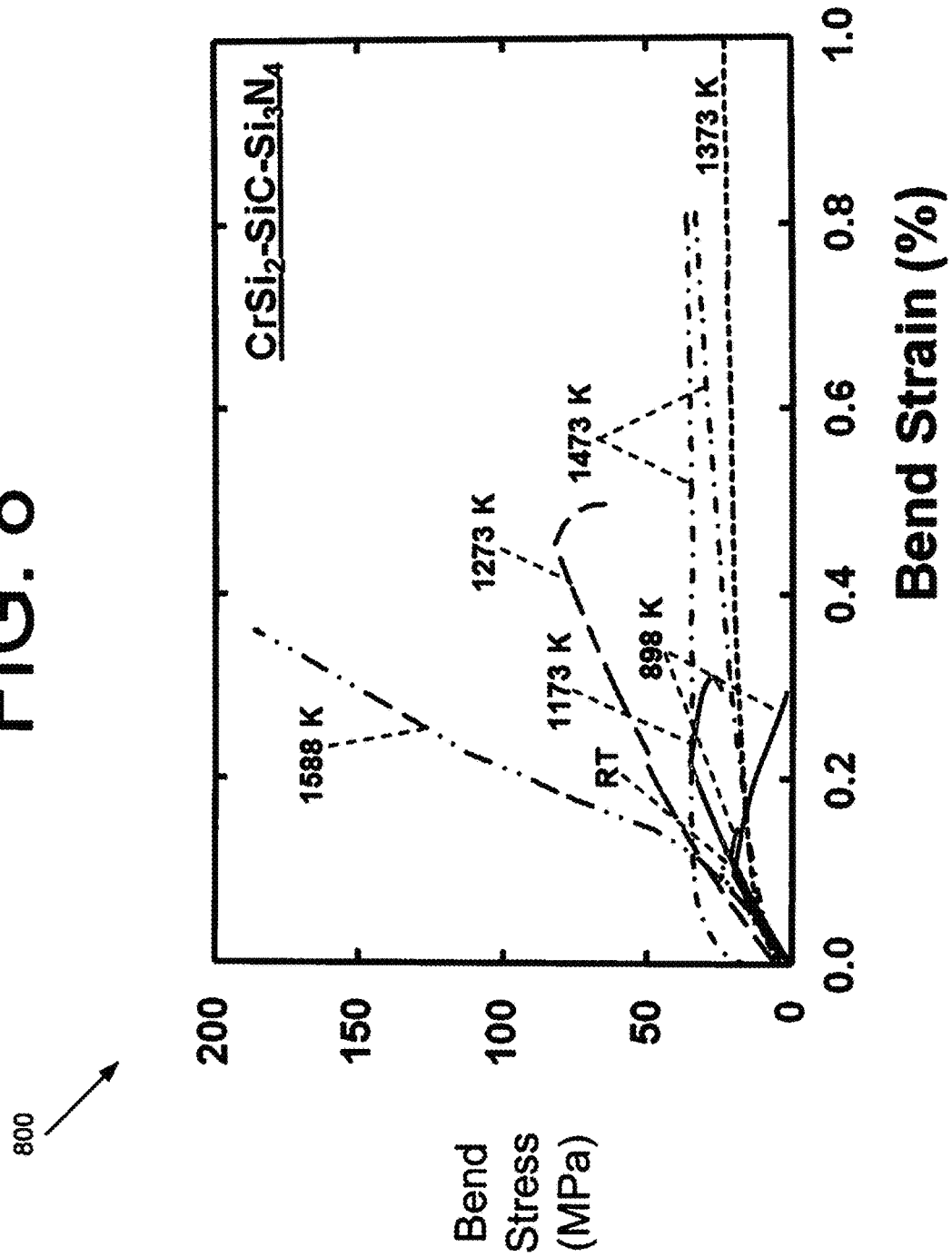
FIG. 8 is a graph illustrating the plasticity of a $CrSi_2$—SiC—$Si_3N_4$ engineered matrix at high temperatures, according to an embodiment of the present invention.

FIG. 8 is a graph 800 illustrating the plasticity of an engineered matrix at high temperatures, according to an embodiment of the present invention. In this embodiment, graph 800 shows the plasticity of an engineered $CrSi_2$/SiC/$Si_3N_4$ matrix at high temperatures similar to those in an aircraft engine. It should be appreciated that the concept of plastic blunting discussed with respect to FIG. 2 is evident with the increase in the bend strength at 1588 K, where the plasticity of matrix has effectively blunted the crack tip and decreased crack propagation.

Figure 9:
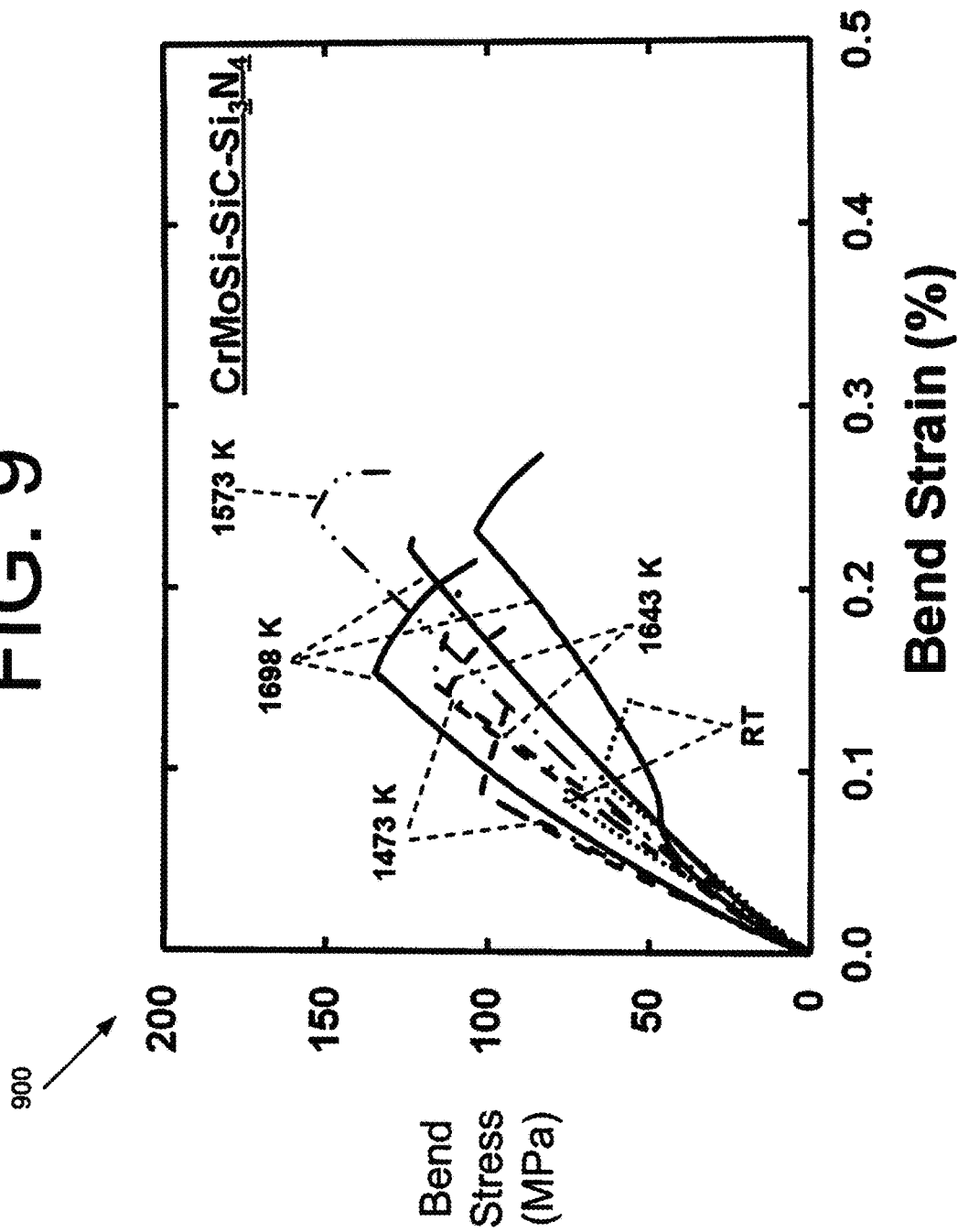
FIG. 9 is a graph illustrating bend stress-strain curves for CrMoSi—SiC—$Si_3N_4$ engineered matrices at different temperatures, according to an embodiment of the present invention.

FIG. 9 is a graph 900 illustrating bend stress-strain curves for engineered matrices at different temperatures, according to an embodiment of the present invention. In this embodiment, graph 900 shows that the plasticity of an engineered CrMoSi/SiC/$Si_3N_4$ matrix at high temperatures is similar to those in an aircraft engine. The engineered matrix in this embodiment may use 10% CrMoSi/60% SiC/30% $Si_3N_4$. Further, the engineered matrix can withstand temperatures as high as 1873 K much above conventional silicon-based CMSs.

Figure 10:
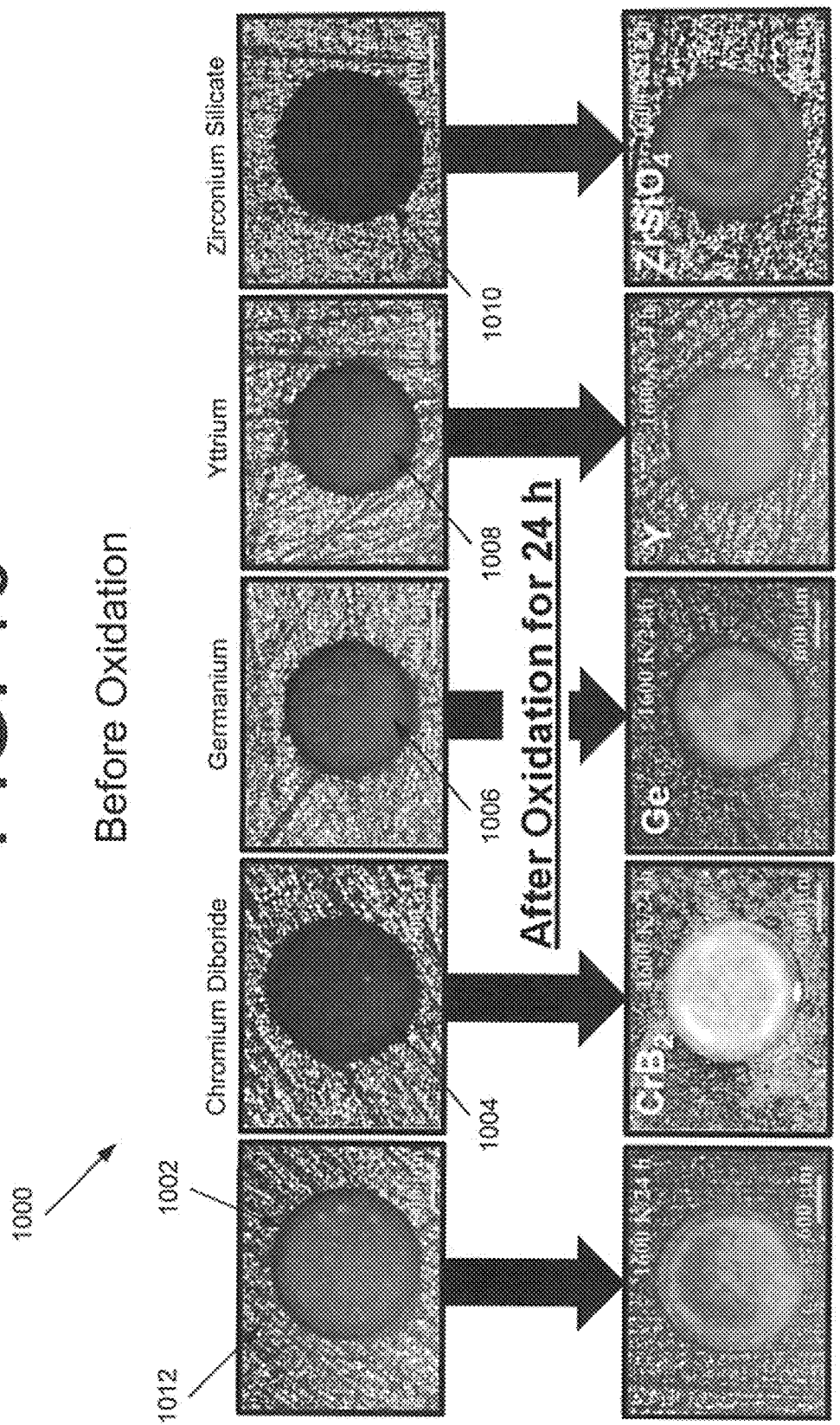
FIG. 10 illustrates self-healing characteristics of an engineered matrix, according to an embodiment of the present invention.

Returning to FIG. 3, engineered matrix 300 has the capability to self-heal 306 a crack 304 to reduce ingress of oxygen. For example, in some embodiments, minor additives may be used either singly or in combination for the engineered matrix 300 to have self-healing capabilities. FIG. 10 illustrates self-healing characteristics of an engineered matrix 1000, according to an embodiment of the present invention. Engineered matrix may include CrMoSi, SiC and/or $Si_3N_4$ with different additives. See Table 1 for a list of the minor additives.

In this embodiment, engineered matrix 1000 may be composed of CrMoSi/SiC or CrMoSi/SiC/$Si_3N_4$. Before oxidation, engineered matrix 1000 includes scratches 1012 with a pre-drilled hole 1002. Pre-drilled hole 1002 in this embodiment has a diameter of approximately 1 mm.

Pre-drilled hole 1002 may be filled with low viscosity oxides due to minor additives such as boron carbide, chromium diboride, germanium 1006, yttrium 1008, zirconium diboride or zirconium silicate 1010. Each of these additives may be aged for a predefined period of time. For example, FIG. 10 shows specimens with scratches which have self-healed after oxidation at 1600 K for 24 h.

Figure 11:
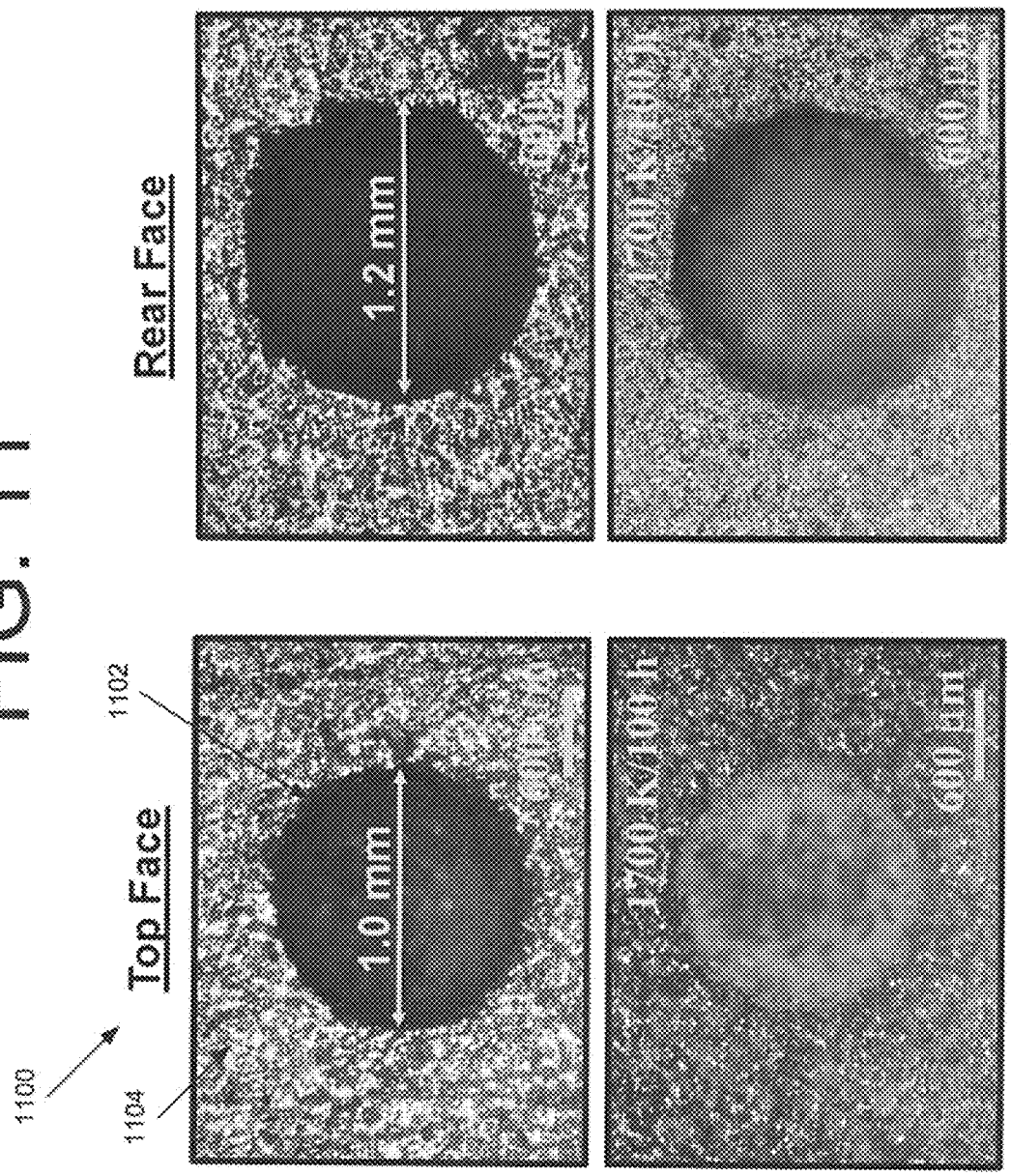
FIG. 11 shows a top face and a rear face of an engineered matrix, according to an embodiment of the present invention.

FIG. 11 shows a top face and a rear face of an engineered matrix 1100, according to an embodiment of the present invention. In particular, FIG. 11 shows in this embodiment a top face and a rear face of a CrMoSi/SiC engineered matrix with a minor additive after oxidation at 1700 K for 100 hour. In this example, matrix 1100 includes scratches 1104 and a hole 1102. The diameter of hole 1102 with respect to the top face and rear face may vary in size. In this embodiment, hole 1102 is filled with a minor additive in the CrMoSi/SiC matrix. After 100 hours of oxidation at 1700 K, engineered matrix 1100 appears to be healing.

Figure 12:
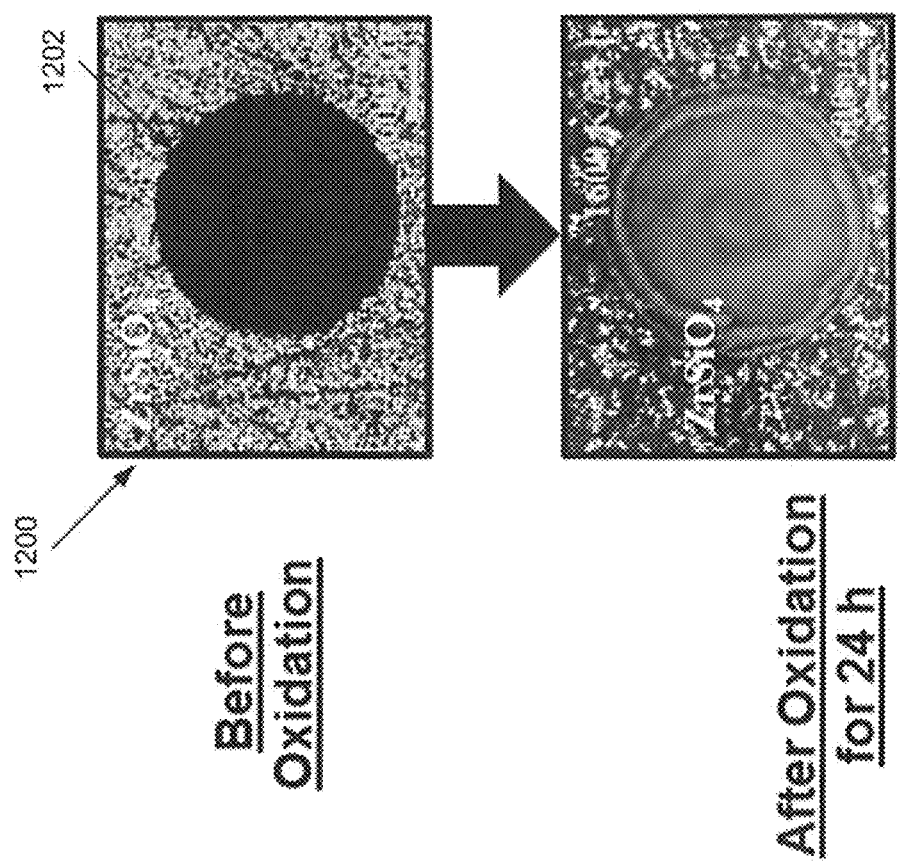
FIG. 12 shows the self-healing of a $CrSi_2$/SiC engineered matrix using different minor additives after oxidation at 1600 K for 24 h, according to an embodiment of the present invention.

FIG. 12 illustrates self-healing of an engineered matrix 1200 using different additives, according to an embodiment of the present invention. In particular, FIG. 12 shows self-healing of a $CrSi_2$/SiC engineered matrix 1200 using different minor additives after oxidation at 1600 K for 24 h. For example, in this embodiment, additives, such as zirconium silicate, are applied to hole 1202 of engineered matrix 1200. It should be appreciated that in other embodiments a combination of boron carbide, chromium diboride, germanium, yttrium, zirconium diboride and zirconium silicate may be used for the engineered matrix to have the self-healing capabilities.

It should be noted that the self-healing engineered matrix may also be dense to increase the thermal conductivity of the fiber reinforced composite. The infiltration of the preform has two components—slurry infiltration and melt infiltration. The filling of voids inside the preform with slurry and melt infiltration increases the thermal conductivity of the composite over that of the preform.

Figure 13:
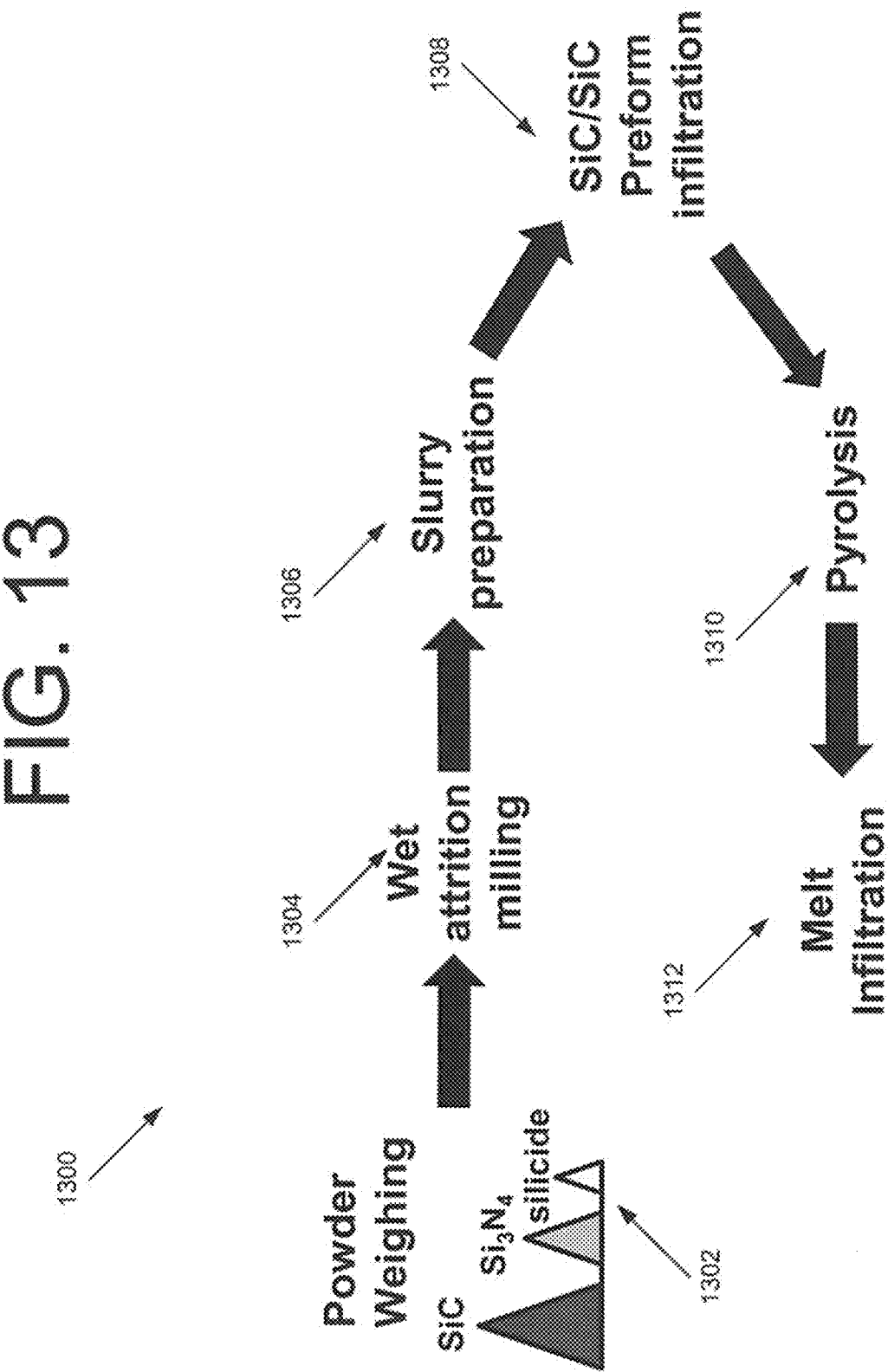
FIG. 13 is a flow diagram illustrating a typical fabrication process for an engineered matrix composite, according to an embodiment of the present invention.

FIG. 13 is a flow diagram 1300 illustrating a fabrication process for fabricating an engineered matrix composite (EMC), according to an embodiment of the present invention. The process begins at 1302 with combining a mixture of silicon carbide, silicon nitride, silicide powders and one or more self-healing additives. It should be appreciated that other compounds may be combined to form the engineered matrix, as would be understood by a person of ordinary skill in the art. At 1304, wet attrition milling is applied to the combination of silicon carbide, silicon nitride, silicide powders and the one or more self-healing additives using a mixture of organic media including surfactants and binders as necessary.

At 1306, engineered matrix slurry is prepared prior to the infiltration of the SiC/SiC preform by mixing the powders with organic compounds, such as resins, hardener, carbon and solvents, in sufficient amounts to adjust the viscosity and pH of the slurry to modify its flow properties. At 1308, the SiC/SiC preform is infiltrated with the engineered matrix slurry either under gravity, vacuum and/or high pressure depending on the slurry composition, viscosity and pH to allow the particulates to be spread uniformly within the cavities of the preform.

It should be appreciated that other fabrication processes may be used, such as coating the fiber tows and making a tape and stacking up the tape. Another process may be to coat a 2-D cloth with the matrix slurry, cutting and packing the cloth, and then further processing to create a fully dense composite.

Figure 14:
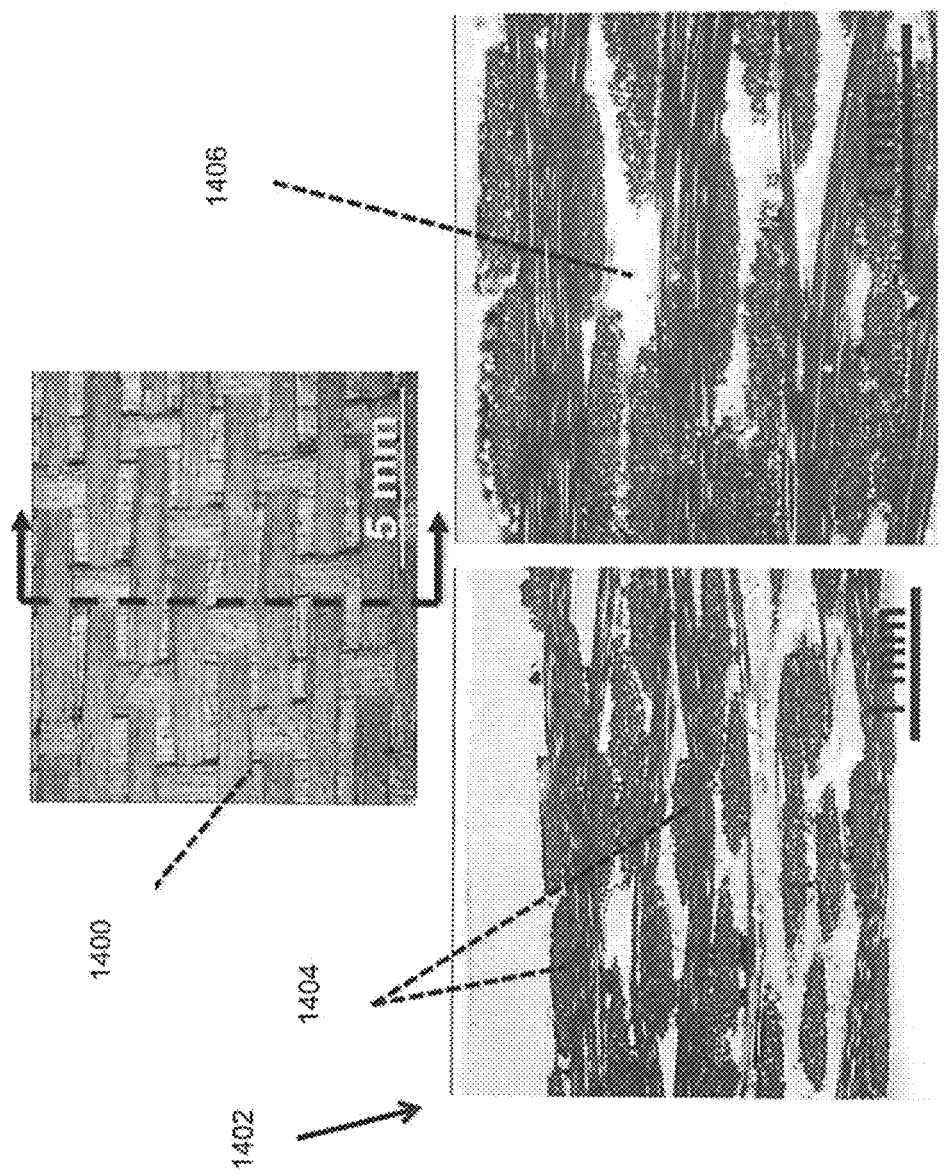
FIG. 14 illustrates an uninfiltrated preform and an infiltrated preform, according to an embodiment of the present invention.

FIG. 14 illustrates an uninfiltrated preform 1400 and an infiltrated preform 1402, according to an embodiment of the present invention. In particular, FIG. 14 shows a $TiSi_2$/SiC/$Si_3N_4$ infiltrated preform 1402 and an uninfiltrated SiC/SiC preform 1400, where fibers 1404 surround epoxy infiltrated particulates 1406.

Figure 15:
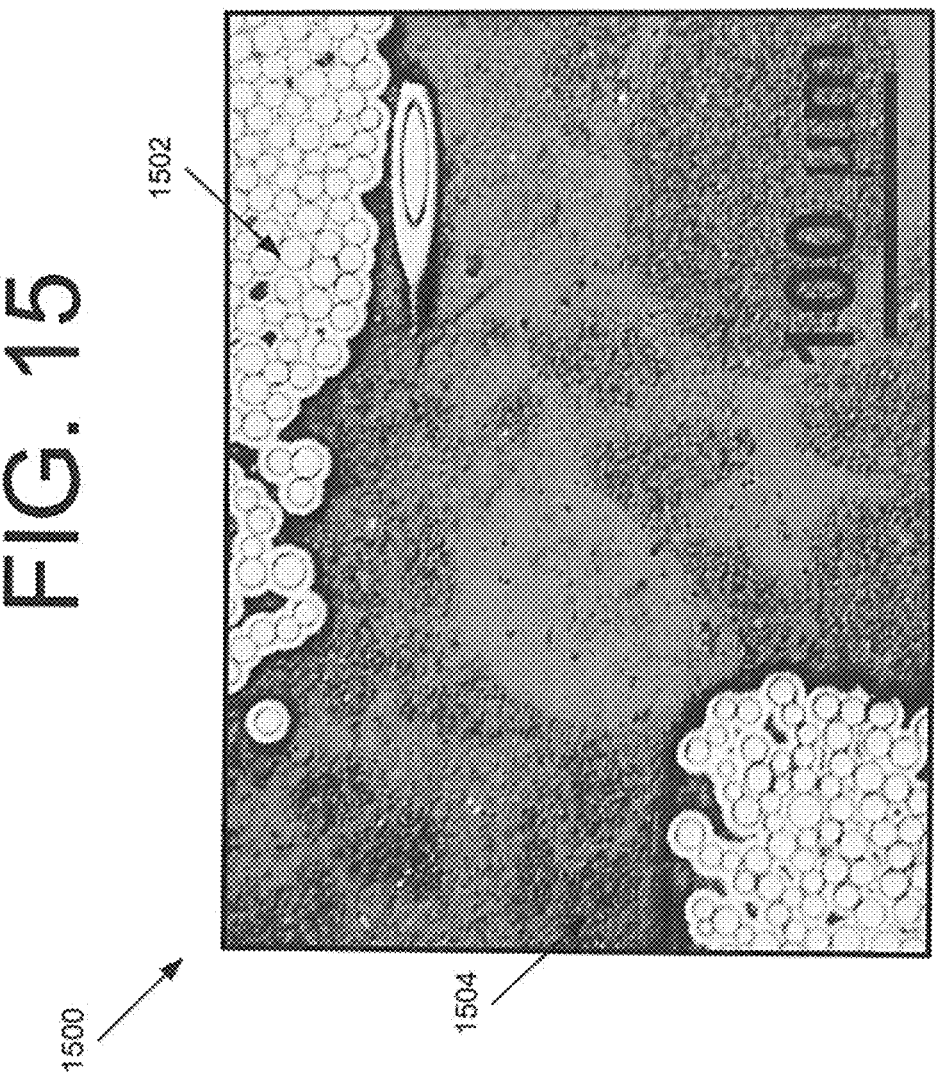
FIG. 15 illustrates an optical micrograph of a slurry infiltrated SiC/SiC preform with a CrMoSi/SiC/$Si_3N_4$-epoxy mixture in to fill the voids between fibers, according to an embodiment of the present invention.

FIG. 15 illustrates an optical micrograph of a slurry infiltrated SiC/SiC preform 1500 with a CrMoSi/SiC/$Si_3N_4$-epoxy mixture 1504 filling the voids between fibers 1502, according to an embodiment of the present invention. In particular, FIG. 15 shows an optical micrograph of a BN/SiC coated SiC/SiC preform 1500 particulate infiltrated with a CrMoSi/SiC/$Si_3N_4$ engineered matrix 1504.

Returning to FIG. 13, at 1310, pyrolysis is performed by burning off the organic content present in the slurry-infiltrated SiC/SiC preform. This process may leave a carbon char along with the engineered matrix constituents and voids. Steps 1308 and 1310 may be repeated if necessary. At 1312, melt infiltration is performed by infiltrating molten Si, SiGe, $CrSi_2$, CrSi, $Cr_5Si_3$, $Cr_3Si$ and/or CrMoSi with Mo between 0 to 40 atomic percent and Si between 23 and 67 percent (see Table 1) into the slurry-infiltrated SiC/SiC preform to fill in the voids left behind due to the burning off the organic material during the pyrolysis step 1310.

Figure 16:
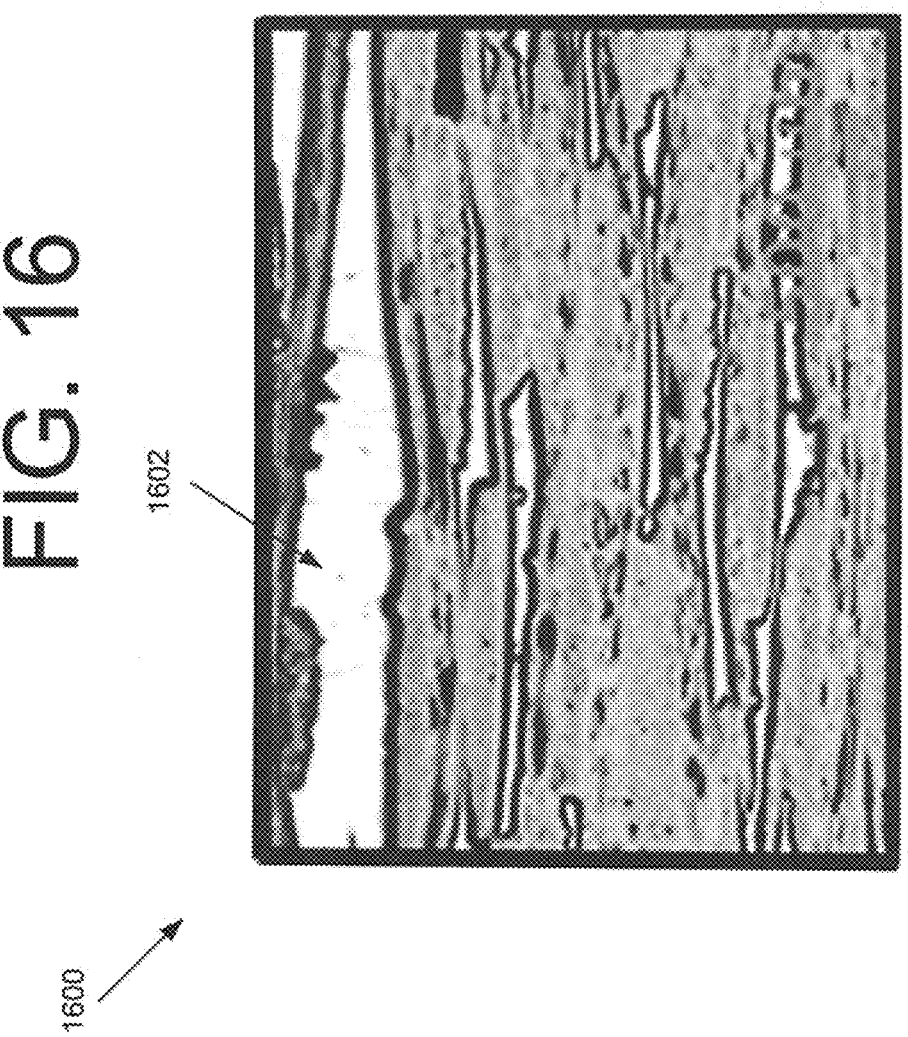
FIG. 16 illustrates the melt infiltration of $CrSi_2$ into BN/SiC coated SiC/SiC preform, according to an embodiment of the present invention.

FIG. 16 illustrates the melt infiltration of $CrSi_2$ into BN/SiC coated SiC/SiC preform 1600, according to an embodiment of the present invention. In particular, melt infiltrated SiC/SiC preform may include voids between the fibers that are filled by molten $CrSi_2$ 1602. Other embodiments may include molten Si, SiGe, CrSi, $Cr_5Si_3$, $Cr_3Si$ and/or CrMoSi with Mo between 0 to 40 atomic percent and Si between 23 and 67 atomic percent Si.

Figure 17:
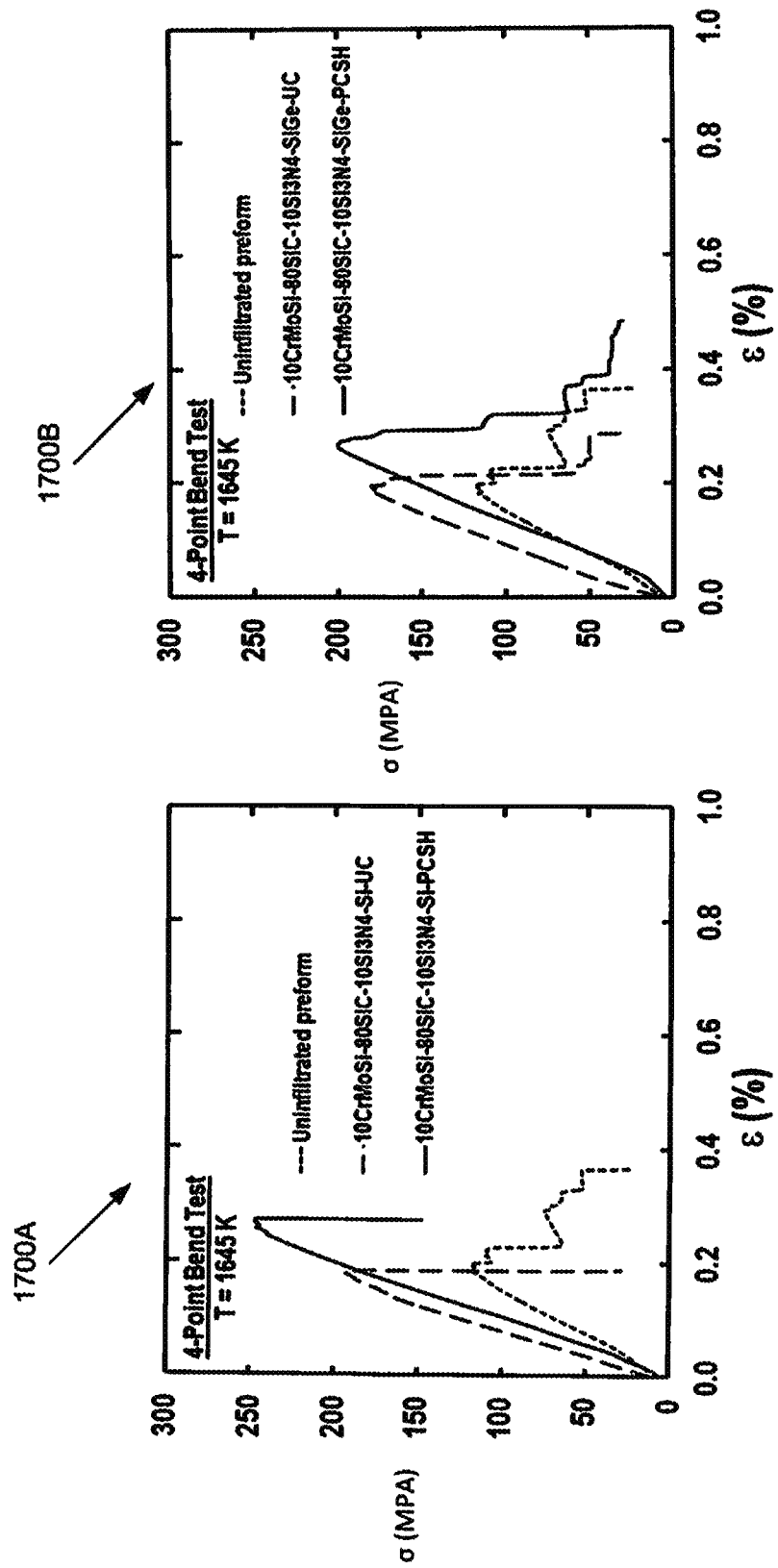
FIG. 17 are graphs illustrating self-healing characteristics of a BN/SiC double layer coated SiC/SiC preform particulate infiltrated with a CrMoSi/SiC/$Si_3N_4$ engineered matrix and melt infiltrated with either Si or SiGe, according to an embodiment of the present invention.

FIG. 17 are graphs 1700A and 1700B illustrating self-healing characteristics of a BN/SiC coated SiC/SiC preform particulate infiltrated with a CrMoSi/SiC/$Si_3N_4$ engineered matrix and melt infiltrated with either Si or SiGe, according to an embodiment of the present invention. In particular, FIG. 17 compares the bend stress-strain curves for uninfiltrated and uncracked (UC) CrMoSi/SiC/$Si_3N_4$ particulate infiltrated preform with a cracked and self-healed (SH) CrMoSi/SiC/$Si_3N_4$ particulate infiltrated preform tested at 1645 K. Graph 1700A shows a preform that has been melt infiltrated with molten Si while graph 1700B shows a preform that has been melt infiltrated with SiGe. From the comparison, it should be noted that particulate and melt infiltrated preforms show higher strength after pre-cracking (PC) and a self-healing heat treatment.

Certain embodiments of the present invention pertain to an engineered matrix that includes a mixture of $CrSi_2$, CrSi, $Cr_3Si$ and/or CrMoSi alloy with Mo between 0 to 40 atomic percent and Si between 23 and 67 atomic percent Si, $Si_3N_4$ and silicon carbide, and with self-healing additives. The mixture is configured to blunt cracks in a plurality of fibers, as well as heal the cracks to reduce the ingression of oxygen into the plurality of fibers.

Figure 18:
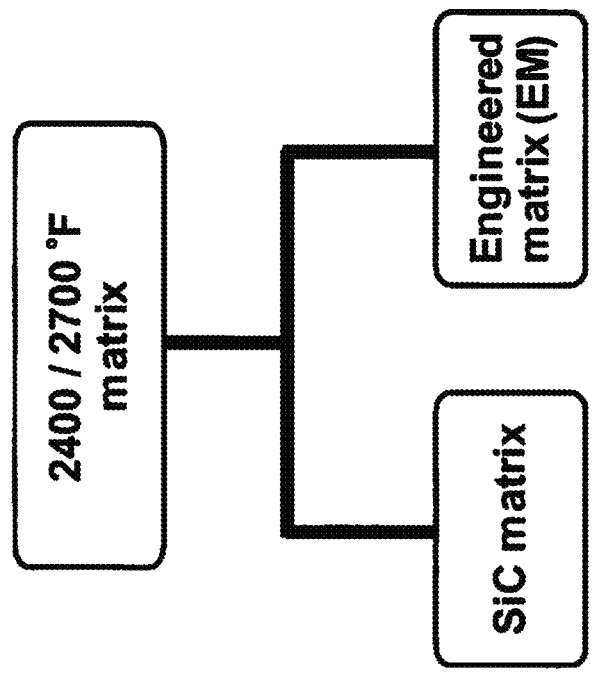
FIG. 18 is a diagram illustrating an engineered SiC matrix as an alternative concept to the traditional SiC CMC matrix, according to an embodiment of the present invention.

FIG. 18 is a diagram illustrating an engineered SiC matrix 1800, according to an embodiment of the present invention. In this embodiment, engineered SiC matrix 1800 may serve as an alternative concept to the traditional SiC matrix for CMCs.

Figure 19:
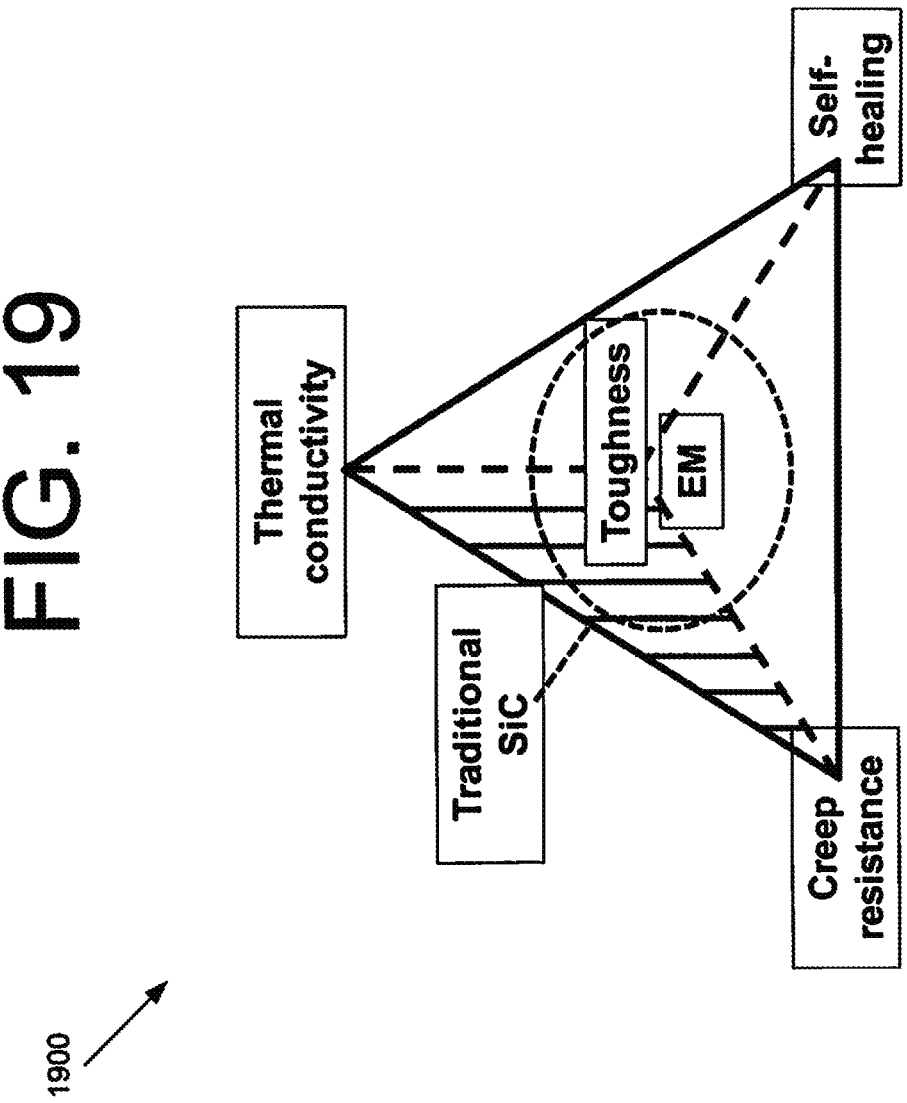
FIG. 19 is a diagram illustrating that the optimized critical matrix properties for the engineered matrix (EM) lies within the tetrahedral, according to an embodiment of the present invention.

FIG. 19 is a diagram illustrating a tetrahedral 1900 showing optimization of critical matrix properties for the engineered matrix (EM), according to an embodiment of the present invention. In this diagram, the critical properties of the traditional SiC lies on the edge of tetrahedral 1900. For example, the traditional SiC CMCs have optimized thermal conductivity and creep resistance properties, which is why the traditional SiC is between thermal conductivity and creep resistance in tetrahedral 1900. Thus, this matrix concept is limited in the design space.

In some embodiments, the EM may have additional properties, such as fracture toughness and self-healing, which the traditional matrix does not have. The EM may give more flexibility in designing the matrix towards the properties desired for a particular component. This flexibility cannot be obtained in the traditional matrix.

With the EM in mind, when looking at FIGS. 2 and 3, crack tip blunting and self-healing may be shown. It should be appreciated that silicide particles at low temperature are generally brittle. At high temperatures above the ductile-to-brittle transition temperature, the silicide particles become ductile, so that is when a crack tip meets one of these particles, it will blunt and stop propagating. This is shown in FIG. 2, i.e., crack blunting 206 due to improved matrix fracture toughness stops the growth of crack 204. In FIG. 3, self-healing component 306 of fine cracks 304 minimizes oxygen ingress to the coated fibers 302.

Because the SiC fibers are coated with boron nitride, the coatings may become oxidized if there is oxygen ingress through surface-connected cracks. The cracks may be stopped by blunting the cracks in some embodiments. Further, the compounds of the matrix may heal the cracks by filling up the crack with low viscosity material. Moreover, the EM may increase reliability and load carrying capacity.

Figure 20:
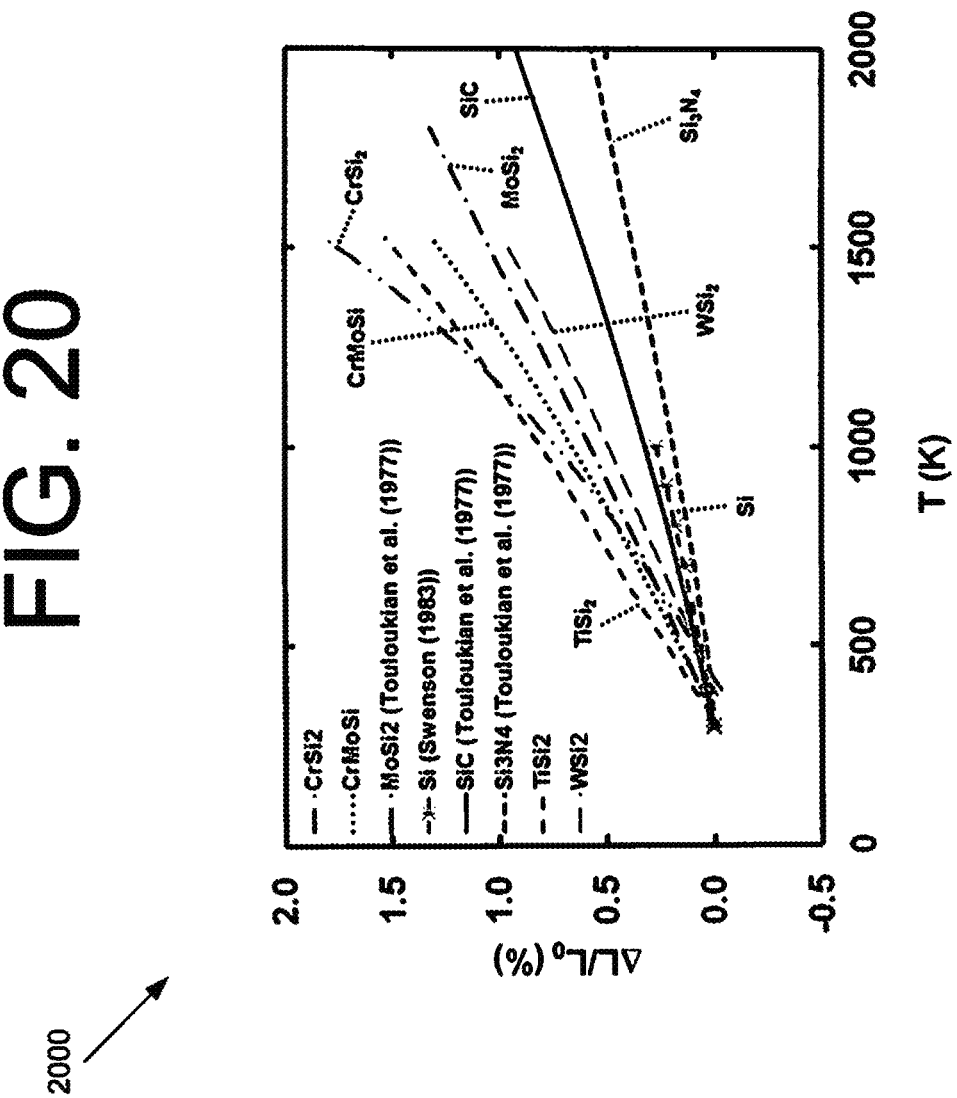
FIG. 20 is a graph 2000 illustrating a comparison of the temperature dependence of the thermal expansions of silicon (Si), silicides and $Si_3N_4$ with SiC, according to an embodiment of the present invention.
Figure 21:
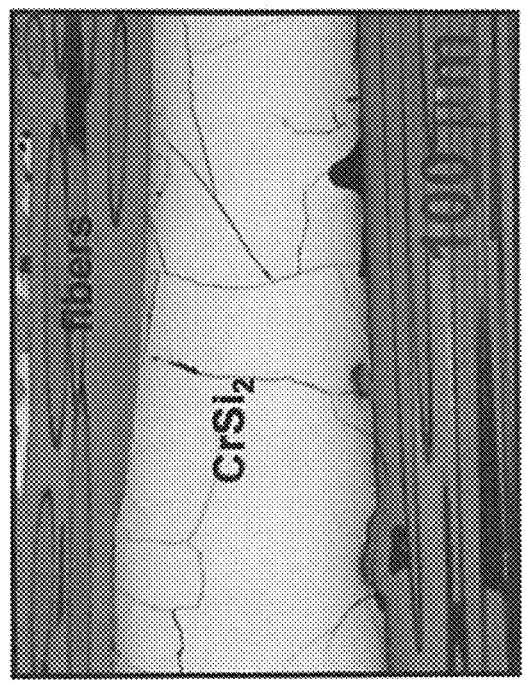
FIG. 21 is an image 2100 showing $CrSi_2$-melt infiltrated Tyranno SA3 preforms, according to an embodiment of the present invention.

FIG. 20 is a graph 2000 illustrating a comparison of the thermal expansion of silicon (Si), silicides and $Si_3N_4$ with SiC, according to an embodiment of the present invention. Graph 2000 shows that silicide matrix cannot be simply inserted into a SiC preform, since the thermal expansion of the silicide matrix and SiC do not match and cracks will develop during thermal cycling. See FIG. 21, which is an image 2100 showing $CrSi_2$-melt infiltrated Tyranno SA3 preforms, according to an embodiment of the present invention. In image 2100, cracks are developed in the matrix due to thermal expansion differences between the SiC fibers and the silicide (i.e., $CrSi_2$ matrix). To prevent the cracks as shown in image 2100, the properties of the EM may be adjusted to match the properties of the SiC preform.

For the purposes of matching the properties, if the thermal expansion of the matrix is below the SiC line, the matrix stresses will be compressive. However, if its thermal expansion is above the SiC line, then the matrix stresses will be tensile. This is more clearly seen in image 2100, when thermal expansion of silicide results in tension, thereby nucleating cracks.

To address this problem, Table 2 shown above may be referred to, and the following formula may be used in the EM design.

$$(\Delta L/L_0)_{fiber} = (\Delta L/L_0)_{EM} = V_{silicide}(\Delta L/L_0)_{silicide} + V_{SiC}(\Delta L/L_0)_{SiC} + V_{Si3N4}(\Delta L/L_0)_{Si3N4}$$

For the traditional SiC matrix, the volume fraction of the SiC particles, $V_{SiC}=100\%$ so that the thermal expansion of the fiber and the matrix are exactly matched per the above equation. In an engineered matrix, some of the SiC particles is replaced by silicide particles of volume fraction $V_{silicide}$. However, FIG. 20 shows that the thermal expansions of silicides are higher than SiC, while that for $Si_3N_4$ is lower. Thus, the replacement of 100% SiC with a volume fraction $V_{silicide}$ of silicide necessitates that a volume fraction $V_{Si3N4}$ be added to formulate the engineered matrix composition so that $(\Delta L/L_0)_{fiber} = (\Delta L/L_0)_{EM}$ is satisfied in the above equation. When self-healing additives are added, the volume fraction of these additives are taken into account using additional terms in the above equation.

Figure 22:
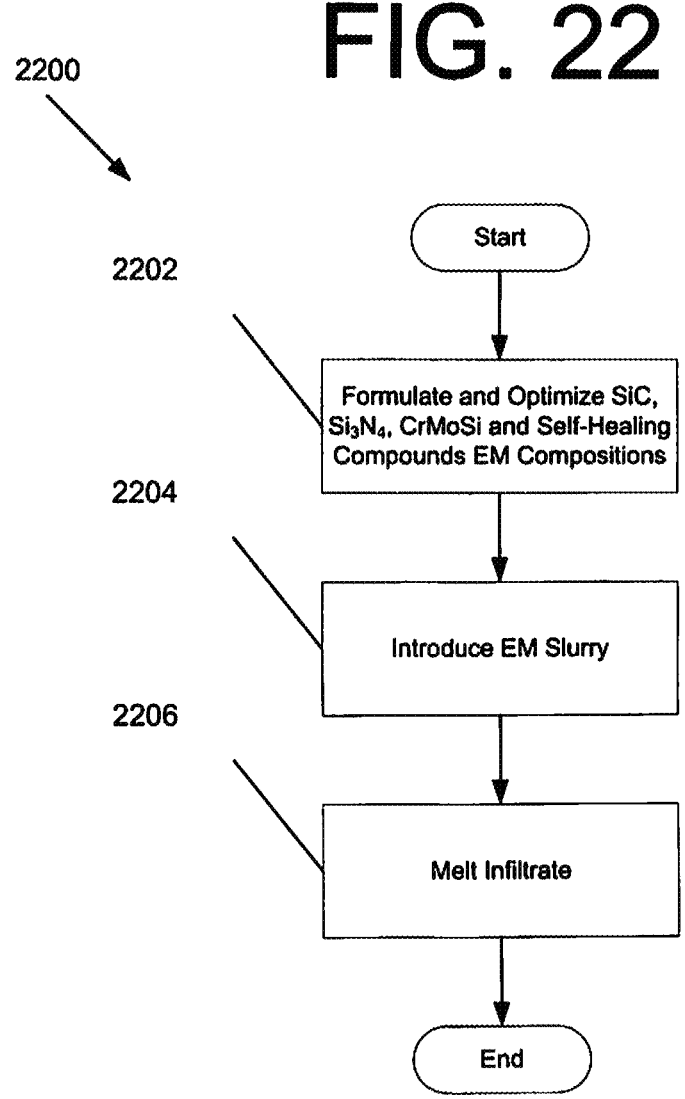
FIG. 22 is a flow diagram illustrating a process for composite fabrication, according to an embodiment of the present invention.

FIG. 22 is a flow diagram illustrating a process 2200 for composite fabrication, according to an embodiment of the present invention. In this embodiment, process 2200 may begin at 2202 with formulating and optimizing the EM composition. For example, SiC, $Si_3N_4$, CrMoSi, and self-healing compounds for the EM compositions may be formulated and optimized.

At 2204, the EM is introduced as a slurry, and infiltrated into the SiC preforms, or in some embodiments, SiC fibers. In an alternative embodiment, the slurry may be sprayed on fibers tows followed by tape casting and hot pressing of 0/90 layup to form the composite. Simply put, the fabrication process is to infiltrate EM slurry into voids in the SiC preforms. The void spacing is infiltrated with the EM slurry in some embodiments. Once that is completed, the EM slurry within the void spacing is similar to loose powder.

Figure 23:
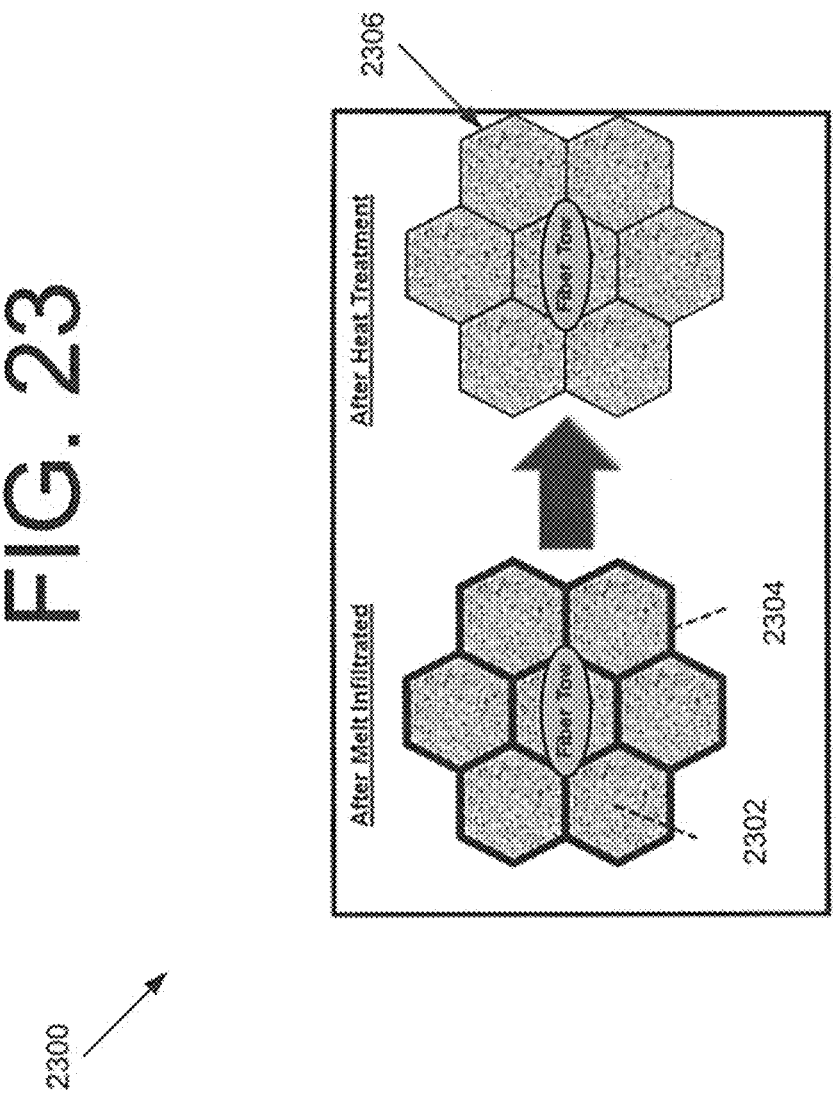
FIG. 23 schematically illustrates SiC preform after melt infiltration and after heat treatment, according to an embodiment of the present invention.

At 2206, $CrSi_2$, CrSi and/or other Cr—Si alloys (e.g. Cr-25% Si) is melt infiltrated to fill in the remaining space in the CMC preforms and to bond the high temperature EM particles. See, for example, SiC preforms 2302 (e.g., SiC+$Si_3N_4$+CrMoSi+self-healing compounds) of FIG. 23, which may be melt infiltrated with silicide 2304 (e.g., $CrSi_2$, CrSi, Cr-25% Si, or some other Cr—Si alloy). These lower melting point silicide alloys may be used to bond the powders by melt infiltration so that there is no loose configuration. The melt may be performed either externally or internally or both.

External melt infiltration is conducted by placing the slurry-infiltrated SiC preform on a C/C woven cloth sufficiently large to wick any excess molten metal. The C/C woven cloth itself is placed on a large boron nitride plate. The silicide powder is placed on top and around the preform to allow the molten metal to flow into the preform from the top face as well as from the four sides. The boron nitride plate containing the C/C woven fabric, the SiC preform, and the silicide powder are inserted into a vacuum furnace, which is then evacuated to a vacuum of $10^{-5}$ to $10^{-6}$ torr. The furnace is then heated to just above the melting point of the silicide powder so that the silicide powder melts and flows into the preform.

Internal melt infiltration is conducted by incorporating the lower melting point silicide in the EM slurry in sufficient amounts. This way, when the preform is heated above the melting point of the silicide, the silicide melts and fills the voids between the particles and any uninfiltrated voids in the preform. This may result in a bonded engineered matrix in the CMC 2306.

Figure 24:
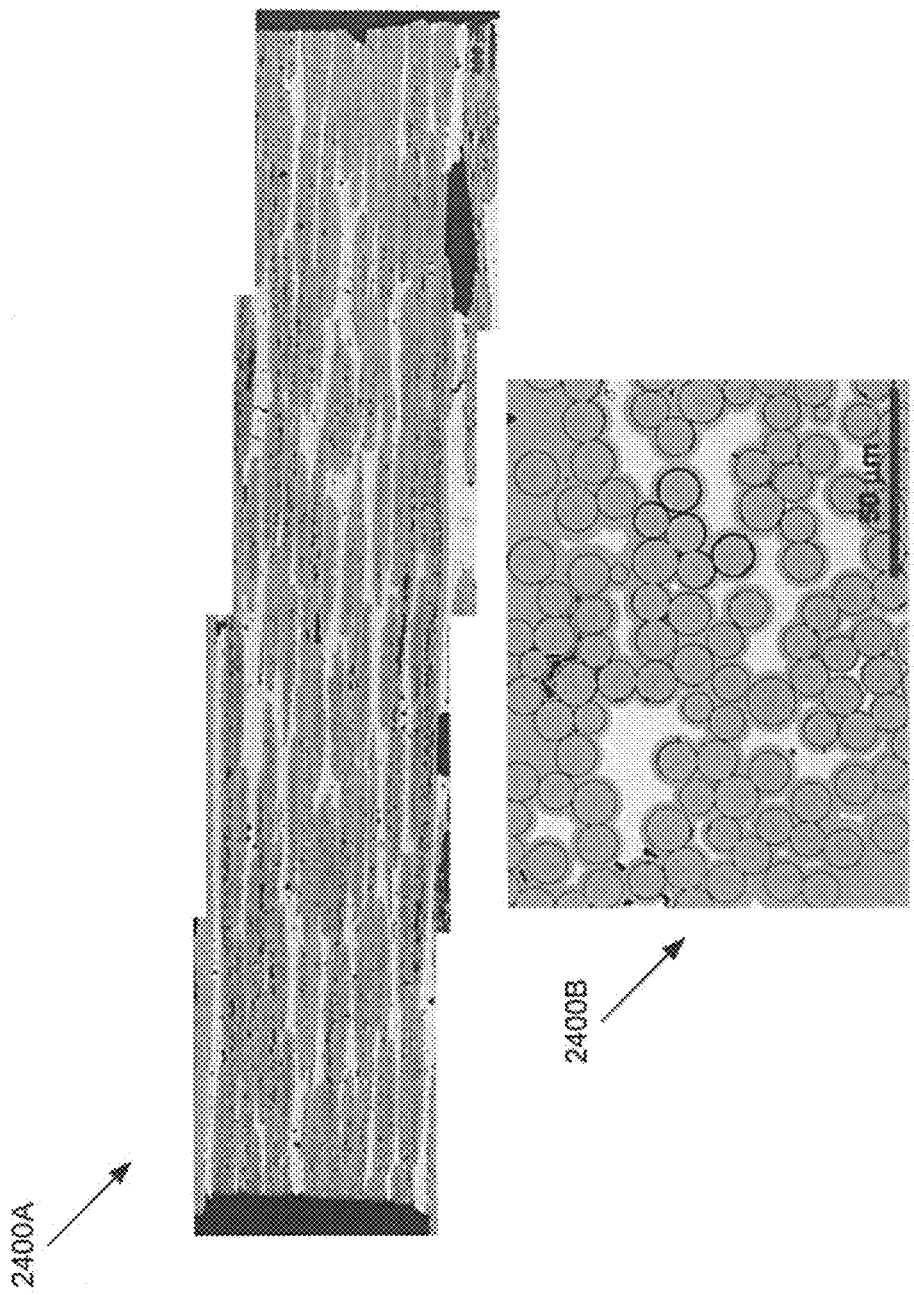
FIG. 24 are images showing optical micrographs of the cross-sections of $CrSi_2$-MI Tyranno SA3, according to an embodiment of the present invention.

FIG. 24 are images 2400A and 2400B showing the optical micrographs of the longitudinal and transverse cross-sections of a Tyranno SA3 preform melt infiltrated with $CrSi_2$, according to an embodiment of the present invention. In this embodiment, the melt infiltrated silicide matrix is shown in images 2400A and 2400B as the light regions, and the CVI SiC/boron nitride (BN)-coated SiC fiber tows are the darker regions. The SiC fiber tows in the Tyranno SA3 preform were first coated with BN and then chemically vapor infiltrated (CVI) with SiC according to well established commercial practice. The preform was then melt infiltrated with $CrSi_2$ in studies designed to determine the melt infiltration parameters. The preforms were not infiltrated with EM. Melt infiltration of the preforms with $CrSi_2$ was conducted between 1765 and 1900 K for infiltration times between 0.25 and 2 h under high vacuum. Image 2400A shows an almost completely infiltrated preform.

In this embodiment, image 2400B shows a fiber with a dark ring of BN coating improving low temperature toughness. Surrounding the fiber and the dark ring, the SiC matrix is deposited via CVI. This CVI SiC may protect the BN coating in some embodiments.

Figure 25:
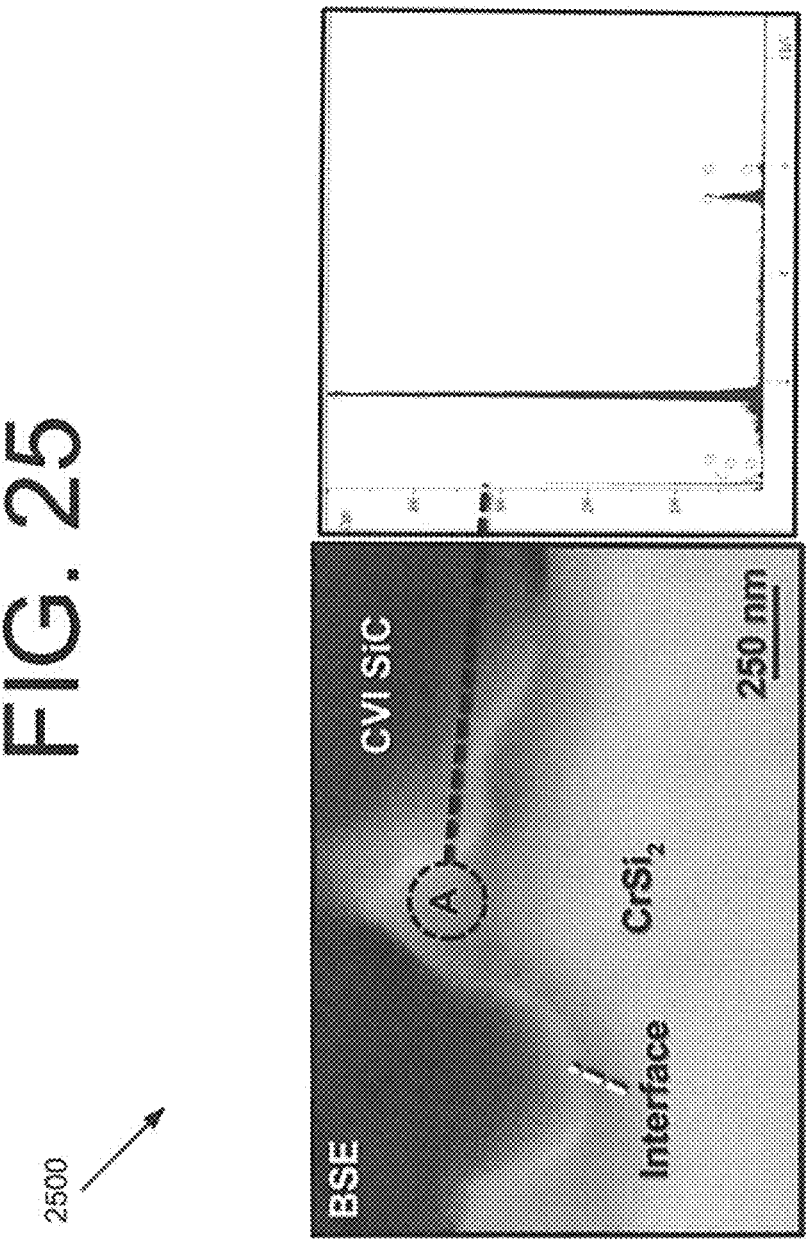
FIG. 25 illustrates an image and an energy dispersive spectrum that show the composition analysis near the $CrSi_2$/CVI SiC interface, according to an embodiment of this invention.

FIG. 25 illustrates an image 2500A and an energy dispersive spectrum (EDS) 2500B that show the composition analysis of $CrSi_2$/CVI SiC interface, according to an embodiment of this invention. In this embodiment, image 2500A shows a high magnification view of the interface between the $CrSi_2$ matrix and the CVI SiC. More specifically, graph 2500B shows the EDS analysis of region A in 2500A indicating that there is no reaction between the melt infiltrated $CrSi_2$ and the CVI SiC, which is consistent with thermodynamic calculations.

Figure 26:
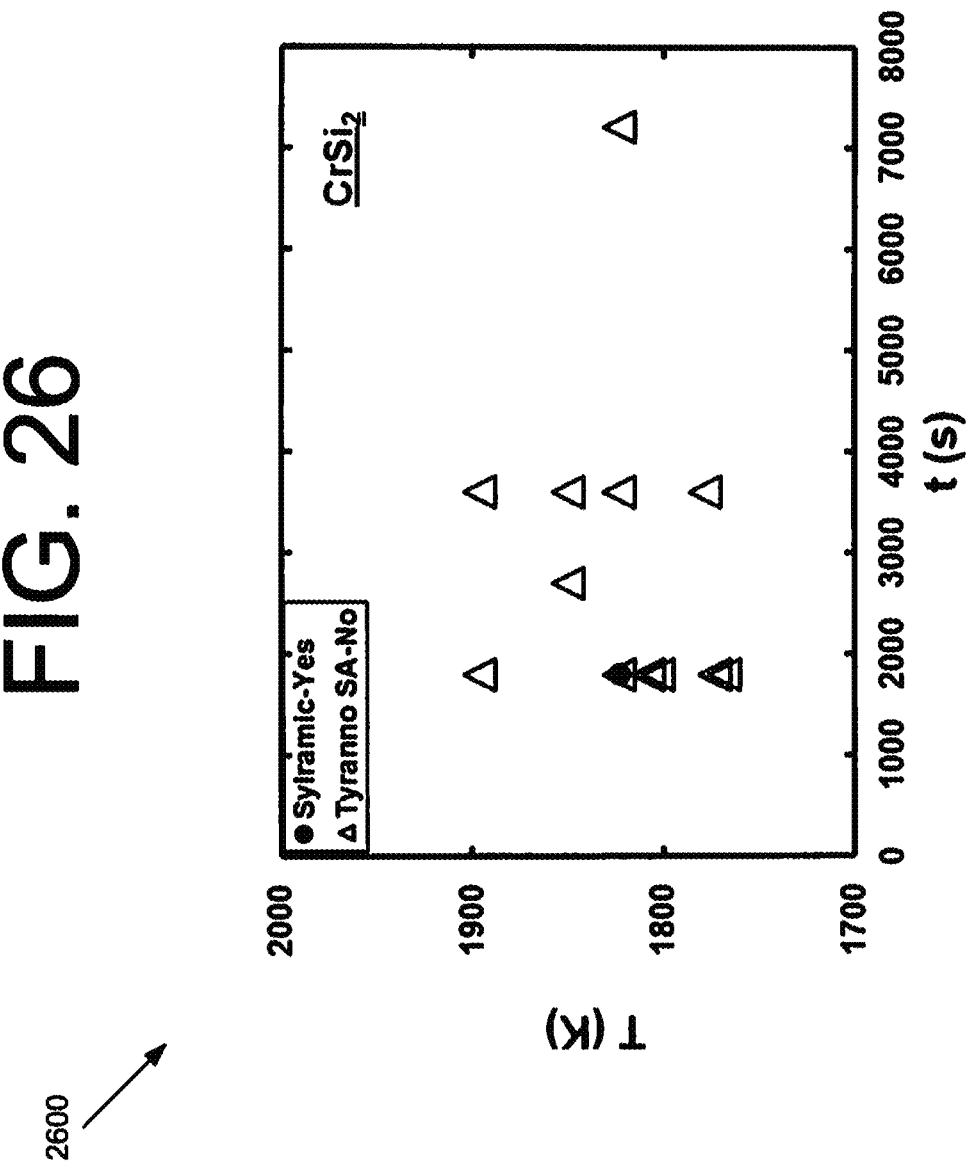
FIG. 26 is a graph illustrating a reaction plot for $CrSi_2$, according to an embodiment of the present invention.

FIG. 26 is a graph 2600 illustrating a reaction plot for $CrSi_2$, according to an embodiment of the present invention. In this embodiment, graph 2600 shows that there are two types of fiber preforms consisting of either Tyranno SA or Sylramic fibers that were investigated in the melt infiltration optimization studies. Graph 2600 shows the melt infiltration temperature plotted as a function of the melt infiltration time when the $CrSi_2$ alloy was used for melt infiltrating the preforms. As shown in FIG. 26, no reaction was observed when the Tyranno SA3 preforms were melt infiltrated with $CrSi_2$. In contrast, some reaction was observed in the case of the Sylramic preform. Although CVI SiC did not react with $CrSi_2$ as shown in FIG. 25, the presence of impurities, such as free carbon and Ti, can lead to a reaction.

Figure 27:
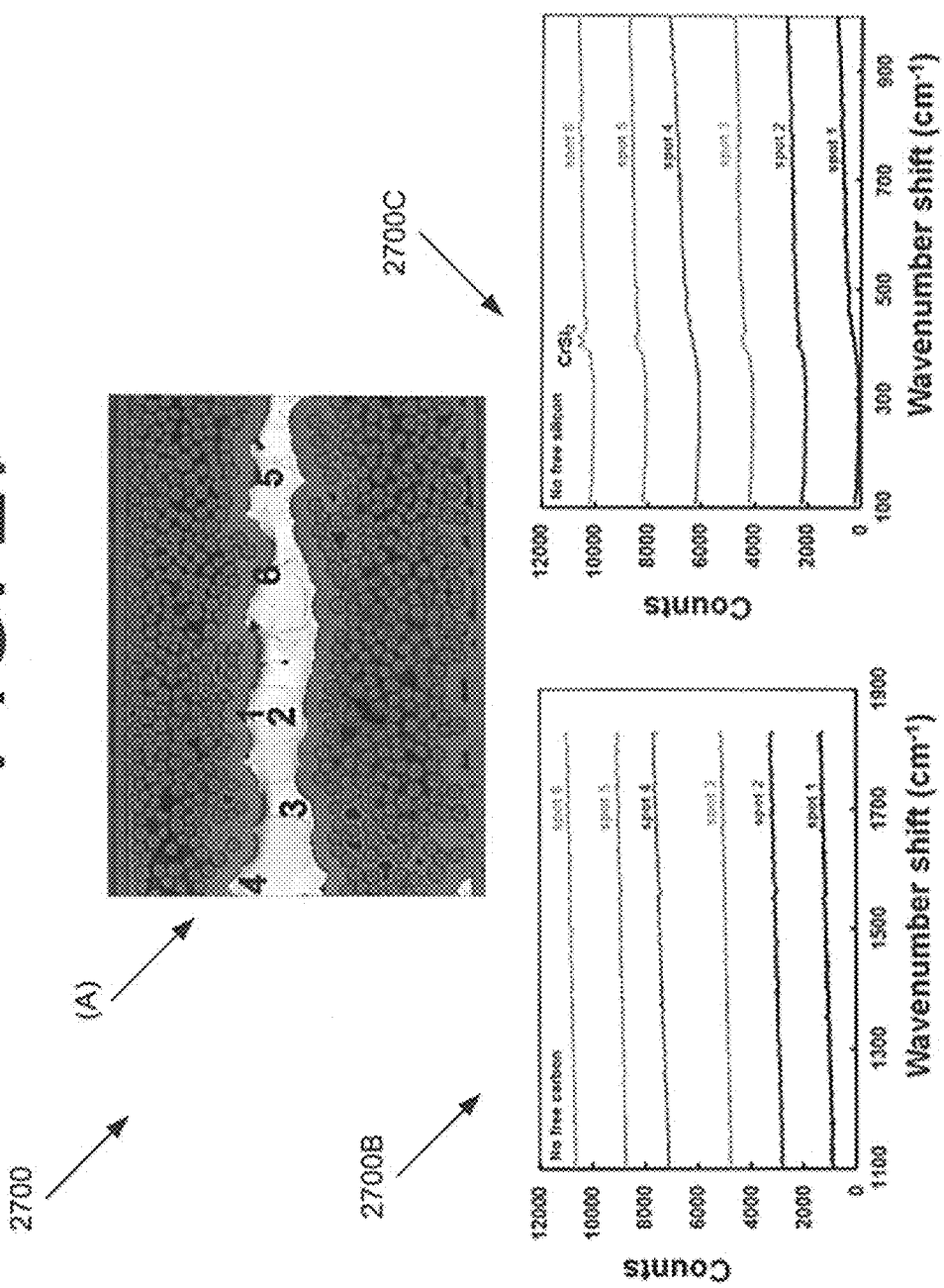
FIG. 27 illustrates a Raman spectra of $CrSi_2$ melt-infiltrated Tyranno SA3 at various locations, according to an embodiment of the present invention.

FIG. 27 illustrates a Raman spectra 2700 of $CrSi_2$ melt-infiltrated Tyranno SA3 obtained at various locations 1 to 6, according to an embodiment of the present invention. Raman spectral spot analyses were obtained from the melt-infiltrated $CrSi_2$ matrix in the Tyranno SA3 preform to determine if there was any free carbon (C) and free Si present. The C and Si spectral data from the six spots identified as 1, 2, 3, 4, 5, and 6 in 2700A are shown in 2700B and 2700C, respectively. As evident in both these spectra, there is no significant free C and free Si in the melt-infiltrated silicide matrix, thereby fulfilling an important objective of this study to minimize or eliminate free Si.

Figure 28:
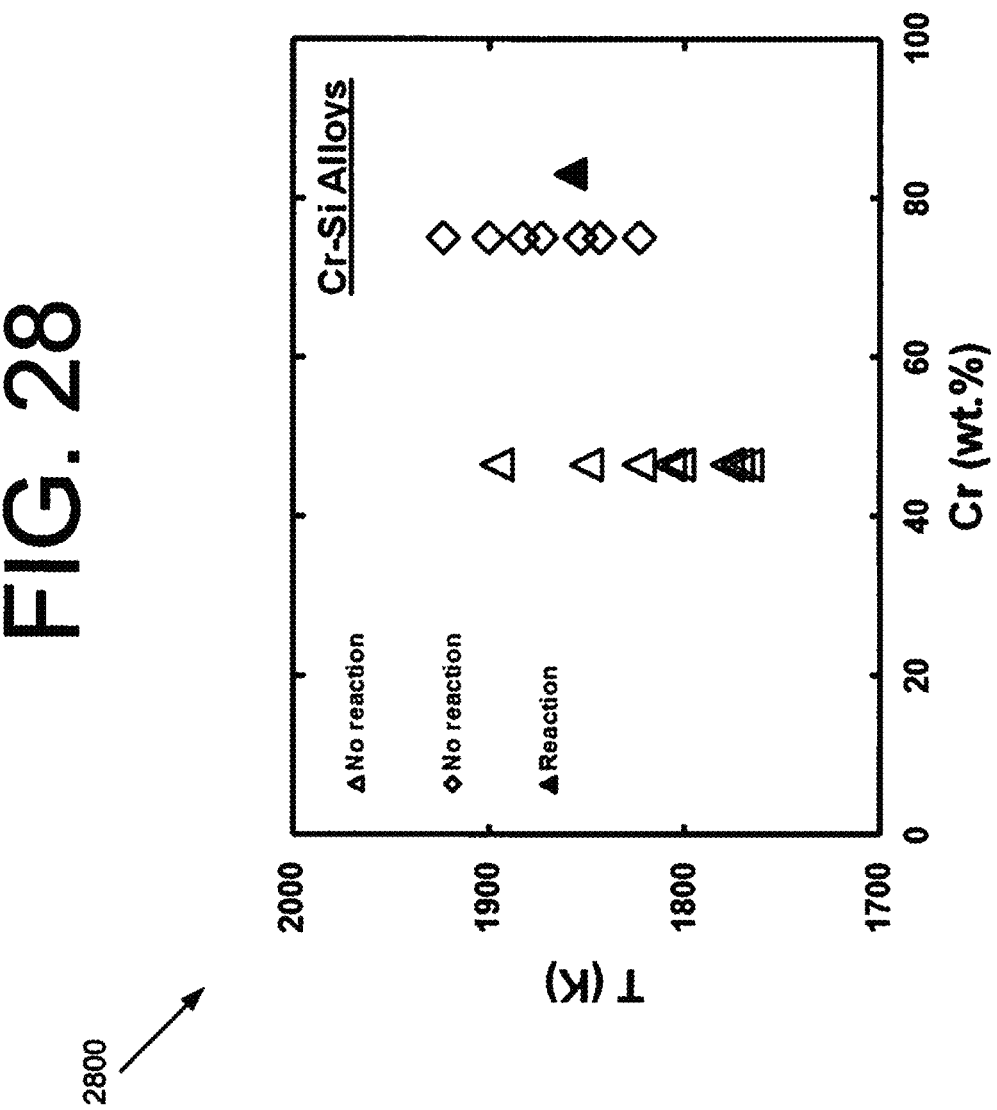
FIG. 28 is a reaction plot illustrating the melt infiltration temperature against Cr composition of the Cr—Si melt after melt infiltration, according to an embodiment of the present invention

FIG. 28 is a reaction plot 2800 illustrating the melt infiltration temperature against Cr composition of the Cr—Si melt after melt infiltration, according to an embodiment of the present invention. In assessing FIG. 28, it is relatively clear that Cr—Si alloys that include more than 80 (wt. %) Cr are likely to react with the CVI SiC, BN coatings and SiC fibers.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A process for fabricating a ceramic matrix composite, comprising:
    formulating an engineered matrix (EM) composition by combining a plurality of powders, wherein the plurality of powders includes a silicon carbide (SiC) powder, a silicon nitride ($Si_3N_4$) powder, and a silicide powder;
    infiltrating a silicon carbide (SiC) preform with an EM slurry having the EM composition; and
    after infiltrating the SiC preform with the EM slurry, melt infiltrating silicide to fill one or more remaining spaces in the SiC preform, thereby bonding particles of the EM composition and filling internal voids, wherein the melt infiltrated silicide comprises $CrSi_2$, CrSi, a Cr—Si alloy, or any combination thereof.

2. The process of claim 1, wherein the silicide powder is a CrMoSi powder, wherein the EM composition further comprises one or more self-healing compounds.

3. The process of claim 2, wherein the one or more self-healing compounds comprises boron carbide, chromium diboride, zirconium silicate, germanium, yttria, or any combination thereof.

4. The process of claim 1, wherein the melt infiltrated silicide comprises $CrSi_2$ or CrSi.

5. The process of claim 1, wherein the melt infiltration is performed externally, internally, or both.

6. The process of claim 5, wherein the melt infiltration is performed externally, and comprises:
    placing the EM slurry infiltrated SiC preform on a C/C woven cloth to wick any excess molten metal, wherein the C/C woven cloth is placed on a large boron nitride plate.

7. The process of claim 6, wherein the melt infiltration further comprises:
    placing silicide powder on top and around the SiC preform, allowing the molten metal to flow into the SiC preform.

8. The process of claim 7, wherein the melt infiltration further comprises:
    inserting the C/C woven cloth, the silicide powder, and the SiC preform into a vacuum furnace, and
    heating the vacuum furnace above a melting point of the silicide powder causing the silicide powder to melt and flow into the SiC preform.

9. The process of claim 5, wherein the melt infiltration is performed internally, and comprises:
    mixing the melt infiltrated silicide with the EM slurry.

10. The process of claim 9, wherein the melt infiltration further comprises:
    heating the SiC preform above a melting point of the silicide, causing the melt infiltrated silicide to melt and fill voids between the particles and one or more uninfiltrated voids in the SiC preforms.

11. A process for fabricating a ceramic matrix composite, comprising:

formulating an engineered matrix (EM) composition by combining a plurality of powders, wherein the plurality of powders includes a silicon carbide powder, a silicon nitride powder, and a powder of a first silicide;

introducing the EM composition as an EM slurry and infiltrating voids in a silicon carbide (SiC) preform with the EM slurry; and after infiltrating the voids in the SiC preform with the EM slurry, melt infiltrating a second silicide to fill one or more remaining spaces in the SiC preform, thereby bonding particles of the EM composition and filling internal voids, wherein the second silicide comprises $CrSi_2$, CrSi, a Cr—Si alloy, or any combination thereof, wherein the second silicide has a lower melting point than the first silicide.

12. The process of claim 11, wherein the EM composition comprises $SiC+Si_3N_4+CrMoSi+$one or more self-healing compounds.

13. The process of claim 12, wherein the one or more self-healing compounds comprises boron carbide, chromium diboride, zirconium silicate, germanium, yttria, or any combination thereof.

14. The process of claim 11, wherein the second silicide comprises $CrSi_2$ or CrSi.

15. The process of claim 11, wherein the melt infiltration is performed externally, internally, or both.

16. The process of claim 15, wherein the melt infiltration is performed externally, and comprises:

placing the EM slurry infiltrated SiC preform on a C/C woven cloth to wick any excess molten metal, wherein the C/C woven cloth is placed on a large boron nitride plate.

17. The process of claim 16, wherein the melt infiltration further comprises:

placing a powder of the second silicide on top and around the SiC preform, allowing the molten metal to flow into the SiC preform.

18. The process of claim 17, wherein the melt infiltration further comprises:

inserting the C/C woven cloth, the powder of the second silicide, and the SiC preform into a vacuum furnace, and heating the vacuum furnace above a melting point of the powder of the second silicide causing the powder of the second silicide to melt and flow into the SiC preform.

19. The process of claim 15, wherein the melt infiltration is performed internally, and comprises:

mixing a powder of the second silicide with the EM slurry.

20. The process of claim 19, wherein the melt infiltration further comprises:

heating the SiC preform above a melting point of the second silicide, causing the second silicide to melt and fill voids between the particles and one or more uninfiltrated voids in the SiC preforms.

* * * * *